United States Patent
Ueyanagi

(10) Patent No.: US 6,359,852 B1
(45) Date of Patent: Mar. 19, 2002

(54) OPTICAL HEAD AND OPTICAL DISK APPARATUS

(75) Inventor: Kiichi Ueyanagi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/454,864

(22) Filed: Dec. 7, 1999

(30) Foreign Application Priority Data

Jan. 8, 1999 (JP) ............................................. 11-003459
Jan. 8, 1999 (JP) ............................................. 11-003461

(51) Int. Cl.$^7$ ............................................... G11B 7/00
(52) U.S. Cl. .............. 369/118; 369/112.01; 369/112.23
(58) Field of Search ............................... 369/118, 44.23, 369/44.24, 112.07, 112.09, 112.15, 112.28, 112.1, 112.01, 112.23

(56) References Cited

U.S. PATENT DOCUMENTS

| | | |
|---|---|---|
| 5,497,359 A | 3/1996 | Mamin et al. |
| 5,986,995 A * | 11/1999 | He et al. ..................... 369/103 |
| 6,055,220 A * | 4/2000 | Mamin et al. ............... 369/118 |
| 6,104,691 A * | 8/2000 | Yamamoto et al. ......... 369/118 |
| 6,266,315 B1 * | 7/2001 | Lee et al. .................... 369/118 |

FOREIGN PATENT DOCUMENTS

JP    A 10-92002    4/1998

OTHER PUBLICATIONS

S. Hosaka et al., "Nanometer–Sized Phase–Change Recording Using a Scanning Near–Field Optical Microscope with a Laser Diode", Jpn. J. Appl. Phys. vol. 35 (1996) pp. 443–447.

B.D. Terris et al., "Near–field optical data storage", Appl. Phys. Lett. 68 (2), 1996 pp. 141–143.

T. Suzuki et al., "Solid Immersion Lens Near Field Optical Approach for High Density Optical Recording", Manuscript for Asia–Pacific Date Storage Conference, 1997, #OC–1.

C. W. lee et al., "Feasibility Study on Near Field Optical Memory Using A Catadioptric Optical System", Manuscript for Optical Data Storage Topical Meeting, 1998, pp. 137–139.

* cited by examiner

Primary Examiner—Thang V. Tran
(74) Attorney, Agent, or Firm—Oliff & Berridge, PLC

(57) ABSTRACT

An optical head and an optical disk apparatus are disclosed which are small-sized, permitting the attainment of a high recording density. A laser beam emitted from a semiconductor laser is shaped into a collimated beam by a collimator lens, then is folded mirror at right angles by a folding mirror and enters a light converging type hologram. A collimated beam thus incident on the light converging type hologram is focused to form a light spot on a surface for focusing of a transparent light converging medium. The light thus focused as the light spot on the focusing surface passes through an aperture having a width smaller than the diameter of the light spot and leaks out as a near-field light to the exterior of the transparent light converging medium. A recording layer of an optical disk is irradiated with the near-field light to effect recording or reproduction of information.

39 Claims, 22 Drawing Sheets

OPTICAL HEAD AND OPTICAL DISK APPARATUS

BACKGROUND OF THE INVENTION

1. Field of the Invention

The present invention relates to an optical head and an optical disk apparatus both utilizing a near-field light, particularly an optical head and an optical disk apparatus both permitting the attainment of high-density recording.

2. Description of the Prior Art

Optical disks used in optical disk drives have been becoming larger in both density and capacity from a compact disk (CD) to a digital video disk (DVD), but a still further increase of capacity is now demanded with improvement in performance of computers and in definition of display devices.

The recording density of an optical disk is basically controlled by the diameter of a light spot formed on a recording medium. Recently, as a technique for making the diameter of a light spot smaller, a technique which utilizes a near-field light in a microscope has been applied to optical recording. As conventional optical disk drives using such a near-field light there are known, for example, those disclosed in the literature Jpn. J. Appl. Phys., Vol. 35 (1996), p. 443 and U.S. Pat. No. 5,497,359.

FIGS. 23A and 23B show an optical disk drive disclosed in the literature Jpn, J. Appl. Phys., Vol. 35 (1996), p. 443. As shown in FIGS. 23A and 23B, this optical disk drive, indicated at 190, comprises a semiconductor laser 191 which emits a laser beam 191a, a coupling lens 192 which shapes the laser beam 191a emitted from the semiconductor laser 191 into a collimated beam 191b, a probe 194 which has an optical fiber 193 having been ground so as to be tapered off from an incident end 193a toward an exit end 193b and which introduces the collimated beam 191b from the coupling lens 192 through the incident end 193a, and a recording medium 195 on which data are recorded with a near-field light 191c which leaks out from the exit end 193b of the optical fiber 193.

The recording medium 195 has a recording layer 195a formed by GeSbTe as a phase change medium, which is heated by incidence thereon of the near-field light 191c, thereby inducing a phase change between crystal phase and amorphous phase. Recording is effected by utilizing a change in reflectance between both phases.

The optical fiber 193 is machined so as to have a diameter of 10 μm at the incident end 193a and a diameter of 50 nm at the exit end 193b and it is coated with a metallic film 194b such as aluminum film through a clad layer 194a to prevent light from leaking out to any other portion than the exit end 193b. Since the diameter of the near-field light 191c is about the same as that of the exit end 193b, it is possible to attain a high recording density of ten GB/inch$^2$.

In reproduction, as shown in FIG. 23B, the near-field light 191c which is low in power to an extent not inducing a phase change is radiated to the recording layer 195a and reflected light 191d therefrom is condensed to a photomultiplier tube (hereinafter referred to simply as "photomultiplier") 197 through a condenser lens 196 and is detected.

FIG. 24 illustrates an optical head of the optical disk drive disclosed in U.S. Pat. No. 5,497,359. This optical head, indicated at 50, comprises an objective lens 52 which condenses a collimated light 51 and a spherical bottom-cut SIL (Solid Immersion Lens) 54 which is disposed so that a bottom 54a thereof is perpendicular to a convergent light 53 emerging from the objective lens 52. When the collimated light 51 is converged by the objective lens 52 and a convergent light 53 thus obtained is applied to a semispherical incident surface 54b, the convergent light 53 is refracted by the incident surface 54b and is focused on the bottom 54a, whereby a light spot 55 is formed on the bottom 54a. In the interior of the SIL 54, the wavelength of light becomes shorter in inverse proportion to the refractive index of the SIL 54, so that the light spot 55 also becomes smaller proportionally. Most of the light focused to the light spot 55 is totally reflected toward the incident surface 54b, but a portion thereof leaks out as a near-field light 57 from the light spot 55 to the exterior of the SIL 54. If a recording medium 56 having a refractive index almost equal to that of the SIL 54 is disposed at a distance sufficiently smaller than the wavelength of light from the bottom 54a, the near-field light 57 will be coupled with the recording medium 56 into a propagation light which is propagated within the recording medium 56. With this propagation light, information is recorded in the recording medium 56.

If the SIL 54 is constructed so that the collimated light 51 is converged at a position spaced r/n (r stands for the radius of the SIL) from a center 54c of the semispherical surface 54b, which structure is designated a Super SIL structure, it is possible to diminish a spherical aberration caused by the SIL 54 and increase the numerical aperture in the interior of the SIL 54. Further, it becomes possible to make the light spot 55 very small. More particularly, the light spot 55 is microminiaturized like the following expression:

$$D_{1/2} = k\lambda/(n \cdot NAi) = k\lambda/(n^2 \cdot NAo)$$

where, k: a proportional constant (usually 0.5 or so) which is dependent on the intensity distribution of light beam λ: wavelength of light beam n: refractive index of SIL 54

NAi: numerical aperture in the interior of SIL 54

NAo: numerical aperture of incident light on SIL 54

Since the collimated light 51 is converged as the light spot 55 without being absorbed on the optical path, there is attained a high light utilization efficiency. Consequently, it is possible to use a light source of a relatively low output and the detection of reflected light can be done even without using the photomultiplier.

According to the above conventional optical disk drive 190 it is possible to form a small light spot of several ten nm or so on the recording medium, but since the optical fiber 193 is tapered, a portion of laser light incident on the optical fiber 193 is absorbed in the interior of the optical fiber, thus giving rise to the problem that the light utilization efficiency becomes as low as 1/1000 or less. Therefore, the use of the photomultiplier 197 for the detection of reflected light 191d is unavoidable, with consequent increase in size and cost of the optical head portion. In addition, the response speed of the photomultiplier 197 is low and the optical head portion is heavy, so it is impossible to effect a high-speed tracking and hence impossible to rotate the optical disk at high speed. As a result, there occur various problems, including the problem of a low transfer rate, and thus improvements are needed for practical application of such a conventional optical disk drive.

FIG. 25 is a diagram for explaining a problem of the conventional optical head 50 shown in FIG. 24, which diagram is of an analysis made by Suzuki at #OC-1 of Asia-Pacific Data Storage Conference (Taiwan, '97. 7.). A relation between the refractive index, n, of the SIL 54 and NAo is shown therein. There is a reciprocal relation between NA of incident light on the SIL 54, i.e., maximum value, θmax, of incident angle θ, and the refractive index, n, of the SIL 54. It is not that both can be made large each independently. As is seen from the same figure, with an increase in refractive index, n, of the SIL 54, the maximum value NAomax which the NAo of incident light can take becomes smaller. This is because if NAo increases beyond the maximum value Naomax and the incidence angle becomes larger as a result, then the light concerned enters the recording medium 56 directly without passing through the SIL 54 and consequently the light spot 55 rather expands at the position of the recording medium 56. For example, when the refractive index, n, is equal to 2, the value of NAomax is 0.44 and the product of the two, n·NAomax, falls under the range of 0.8 to 0.9 no matter how the two may be combined. This is a theoretical limit and an actual value is still smaller (0.7 to 0.8).

As to a light converging experiment using the Super SIL structure in question, B. D. Terris, et al. present a report in Appl. Phys. Lett., Vol. 68, ('96), p. 141. According to this report, when a Super SIL having a refractive index, n, of 1.83 is disposed between an objective lens and a recording medium and a laser beam with a wavelength of 0.83 $\mu$m is converged thereby, there is obtained a light spot diameter of 0.317 $\mu$m. That is, a light convergence corresponding to $D_{1/2}=\lambda/2.3$ is attained. But in this case, NA is 0.4 and n·NAmax is 0.73 or so. Moreover, using this system, the possibility of a recording density of $0.38\times Gbits/cm^2$, which is about several times as large as that obtained in the prior art, is verified therein.

Thus, according to the conventional optical head 50, the light utilization efficiency is high, but since there is a reciprocal relation between the refractive index, n, of SIL and the maximum value NAomax, the product of the two, n·NAomax, encounters a theoretical limit of 0.8 to 0.9, actually 0.7 to 0.8. Consequently, even with use of a laser beam having a wavelength of 400 nm, the light spot obtained will be 0.2 $\mu$m or so at most in diameter. Thus, in comparison with the conventional optical disk drive which uses the probe 194 for converging light, the light spot diameter is several times or more larger and hence it is impossible to attain a high recording density.

SUMMARY OF THE INVENTION

Accordingly, the present invention provides an optical head and an optical disk apparatus which are small-sized and which permit the attainment of a high recording density.

According to the present invention, there is provided an optical head which converges a laser beam into a light spot. The optical head has a laser beam emitting unit that emits the laser beam, a transparent light converging medium having a first surface onto which is adhered a hologram having a function of converging the laser beam and on which the laser beam emitted from the laser beam emitting unit is incident through the hologram and a second surface on which the laser beam incident on the first surface is focused to form the light spot, and a light shading film formed on the second surface of the transparent light converging medium and having an aperture in a position where the shading film shades the light spot, the aperture having a width smaller than the diameter of the light spot.

According to this construction it is possible to converge the laser beam even without using an objective lens because there is used a hologram having a laser beam converging function. In addition, the use of such a hologram permits the attainment of a high NA value, whereby a very small light spot can be formed on the second surface of the transparent light converging medium. Since the light spot formed on the second surface is shaded by the shading film having an aperture whose width is smaller than the diameter of the light spot formed on the second surface, there is obtained a very small near-field light spot which is smaller than the light spot formed on the second surface.

According to another aspect of the present invention, the optical head has a laser beam emitting unit that emits the laser beam, a transparent light converging medium having a first surface on which the laser beam emitted from the laser beam emitting unit is incident and which has a function of diffusing the incident laser beam, a second surface which reflects the laser beam incident on the first surface, and a third surface onto which is adhered a hologram having a function of reflecting and converging the laser beam and which causes the laser beam reflected by the second surface to be reflected and converged into a light spot on a different surface by the hologram, and a shading film formed on the second surface of the transparent light converging medium and having an aperture in a position where the shading film shades the light spot, the aperture having a width smaller than the diameter of the light spot.

According to this construction, the laser beam can be converged even without using an objective lens because there is used a hologram having a laser beam reflecting and converging function. With such a hologram, it becomes possible to obtain a high NA value and form a very small light spot on the transparent light converging medium. Since the light spot formed on the surface of the transparent light converging medium is shaded by the shading film having an aperture whose width is smaller than the light spot diameter, there is obtained a very small near-field light spot on the transparent light converging medium.

According to another aspect of the present invention, there is provided an optical disk apparatus having an optical head which converges a laser beam to form a light spot on a rotary disk and which records or reproduces information with use of the light spot. The optical head has a laser beam emitting unit that emits the laser beam, a transparent light converging medium having a first surface onto which is adhered a hologram having a function of converging the laser beam and on which the laser beam emitted from the laser beam emitting unit is incident through the hologram and a second surface onto which the laser beam incident on the first surface is converged to form the light spot, and a shading film formed on the second surface of the transparent light converging medium and having an aperture in a position where the shading film shades the light spot, the aperture having a width smaller than the diameter of the light spot.

According to this construction, the use of a hologram having a laser beam converging function permits the laser beam to be converged even without using an objective lens. As a result, the size in the vertical direction becomes smaller and therefore it is possible to reduce the size of the optical disk apparatus. In addition, since the hologram having a laser beam converging function is used, it becomes possible to obtain a high NA value and hence possible to form a very small light spot on the second surface of the transparent light converging medium. Further, since the light spot formed on the second surface is shaded by the shading film having an aperture whose width is smaller than the diameter of the light spot formed on the second surface, there is obtained a very small near-field light spot smaller than the light spot formed on the second surface.

According to another aspect of the present invention, there is provided an optical disk apparatus having an optical head which converges a laser beam to form a light spot on a rotary disk and which records or reproduces information with use of the light spot. The optical head has a laser beam emitting unit that emits the laser beam, a transparent light converging medium having a first surface on which the laser beam emitted from the laser beam emitting unit is incident and which has a function of diffusing the laser beam, a second surface which reflects the laser beam incident on the first surface, and a third surface onto which is adhered a hologram having a function of reflecting and converging the laser beam and which causes the laser beam reflected by the second surface to be reflected and converged into a light spot on a different surface by the hologram, and a shading film formed on the second surface of the transparent light converging medium and having an aperture in a position where the shading film shades the light spot, the aperture having a width smaller than the diameter of the light spot.

According to this construction, since there is used a hologram having a laser beam reflecting and converging function, the laser beam can be converged even without using an objective lens. As a result, the size in the vertical direction becomes smaller and hence it is possible to attain the reduction in size of the optical disk apparatus. In addition, the use of such a hologram permits the attainment of a high NA value and the formation of a very small light spot on the transparent light converging medium. Further, since the light spot formed on the surface of the transparent light converging medium is shaded by the shading film having the aforesaid aperture, there is obtained a near-field light spot smaller than the light spot formed on the transparent light converging medium.

According to another aspect of the present invention, there is provided an optical disk apparatus having plural rotary optical disks arranged coaxially at a predetermined spacing and also having plural optical heads which converge laser beams to form light spots on the plural optical disks respectively and which record or reproduce information with use of the light spots. Each of the optical heads has a laser beam emitting unit that emits the laser beam, a transparent light converging medium having a first surface onto which is adhered a hologram having a function of converging the laser beam and on which the laser beam emitted from the laser beam emitting unit is incident through the hologram and a second surface onto which the laser beam incident on the first surface is converged to form the light spot, and a shading film formed on the second surface of the transparent light converging medium and having an aperture in a position where the shading film shades the light spot, the aperture having a width smaller than the diameter of the light spot.

According to this construction, the laser beam can be converged even without using an objective lens because a hologram having a laser beam converging function is used. As a result, the size in the vertical direction becomes smaller and it is possible to diminish the spacing between adjacent optical disks. Moreover, the use of the hologram having a laser beam converging function permits the attainment of a high NA value and the formation of a very small light spot on the second surface of the transparent light converging medium. Further, since the light spot formed on the second surface is shaded by the shading film having an aperture whose width is smaller than the diameter of the light spot formed on the second surface, there is obtained a very small near-field light spot smaller than the light spot formed on the second surface.

According to another aspect of the present invention, there is provided an optical disk apparatus having plural rotary optical disks arranged coaxially at a predetermined spacing and also having plural optical heads which converge laser beams to form light spots on the plural optical disks, respectively, and which record or reproduce information with use of the light spots. The optical head has a laser beam emitting unit that emits the laser beam, a transparent light converging medium having a first surface on which the laser beam emitted from the laser beam emitting unit is incident and which has a function of diffusing the laser beam, a second surface which reflects the laser beam incident on the first surface, and a third surface onto which is adhered a hologram having a function of reflecting and converging the laser beam and which causes the laser beam reflected by the second surface to be reflected and converged into a light spot on a different surface by the hologram, and a shading film formed on the second surface of the transparent light converging medium and having an aperture in a position where the shading film shades the light spot, the aperture having a width smaller than the diameter of the light spot.

According to this construction, with use of a hologram having a laser beam reflecting and condensing function, the laser beam can be converged even without using an objective lens. As a result, the size in the vertical direction becomes smaller and it is possible to diminish the spacing between adjacent optical disks. Further, the use of such a hologram makes it possible to obtain a high NA value and form a very small light spot on the transparent light converging medium. Additionally, since the light spot formed on the transparent light converging medium is shaded by the shading film having an aperture whose width is smaller than the diameter of the light spot, there is obtained a very small near-field light spot smaller than the light spot formed on the transparent light converging medium.

BRIEF DESCRIPTION OF THE DRAWINGS

Preferred embodiments according to the present invention will be described in detail based on the drawings.

DETAILED DESCRIPTION OF PREFERRED EMBODIMENTS

Figure 1A:
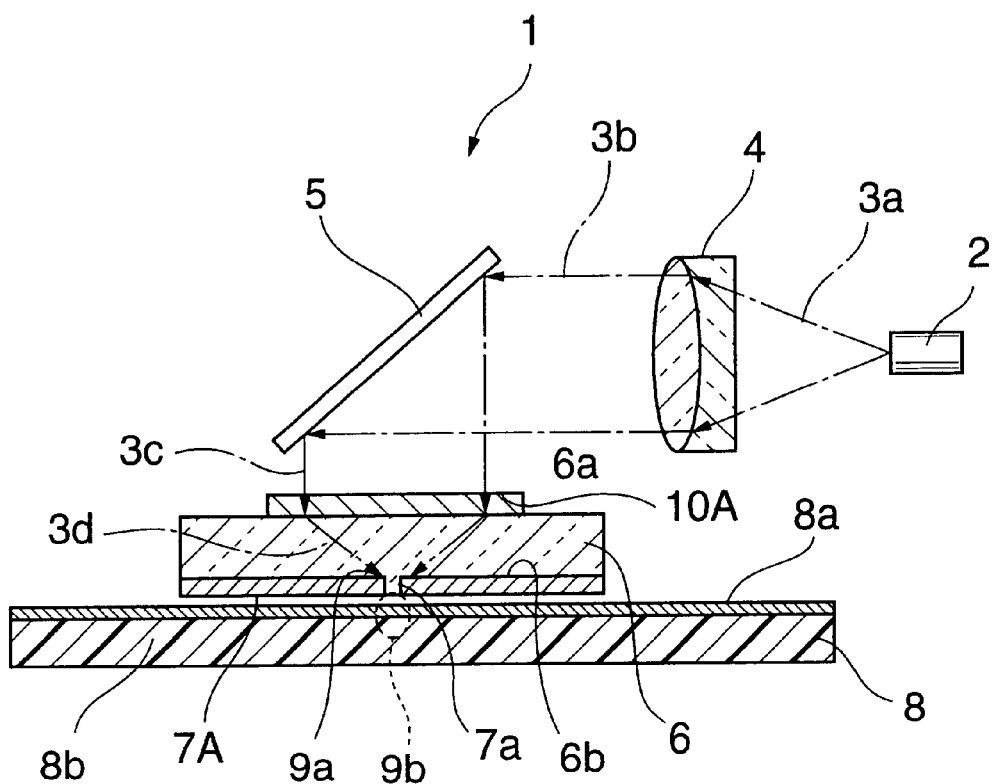
FIG. 1A is a diagram showing a principal portion of an optical head according to the first embodiment of the present invention and FIG. 1B is a bottom view thereof.
Figure 1B:
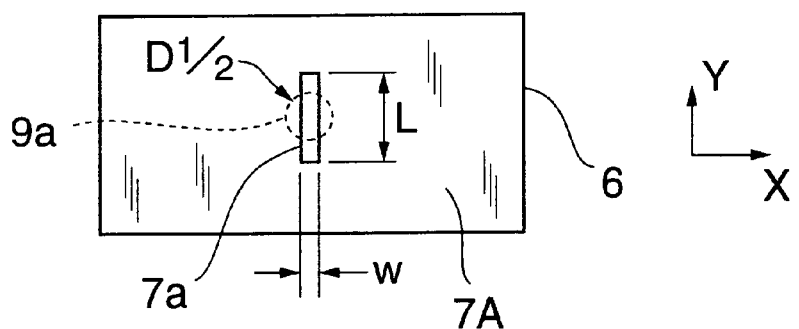

FIGS. 1A and 1B show an optical head according to the first embodiment of the present invention. This optical head, indicated at 1, comprises a semiconductor laser 2 which emits a laser beam 3a, a collimator lens 4 which shapes the emitted laser beam 3a into a collimated beam 3b, a folding mirror 5 which turns down the collimated beam 3b at right angles, and a transparent light converging medium 6 on which the collimated beam 3c is incident from the folding mirror 5.

The transparent light converging medium 6 has an incident surface 6a on which the collimated beam 3c is incident from the folding mirror 5 and on which is formed a light converging type hologram 10A having a light converging function, and a surface 6b for focusing onto which a convergent beam 3d from the incident surface 6a is focused. On the surface 6b for focusing of the transparent light converging medium 6 is formed a shading film 7A having a slit 7a which is formed in a direction Y perpendicular to a track direction X on an optical disk 8.

The light converging type hologram 10A is formed by a binary hologram comprising concentric uneven surfaces. But there may be used a volume hologram formed of a polymer material.

As the semiconductor laser 2 there is used a distributed feed back type laser with little variation in wavelength or a distributed Bragg reflector type laser. This is for the following reason. Because of a marked chromatic aberration of hologram, namely, a marked variation of the diffraction angle based on wavelength, the use of a laser with a high wavelength dependence such as an end-face emitting laser results in deviation of the light focusing position and consequent necessity of using an auto-focusing control mechanism and increase in size of the optical head 1. In the case of a vertical cavity surface emitting laser (VCSEL), the wavelength dependence can be diminished by displacing the center of a gain curve from oscillated wavelength and thus it becomes possible to use such a laser.

More specifically, the thickness of the transparent light converging medium is 0.4 mm, the diameter of the collimated beam 3c is about 6 mm, and the height of the head 1 is about 1 mm. Further, the angle of convergence of the convergent beam 3d is about 60. and NA thereof is 0.87. In this case, the diameter $D_{1/2}$ of a light spot 9a on the surface 6b for focusing is given by the following expression:

$$D_{1/2}=k\cdot\lambda/(n\cdot NA)$$

where k stands for a constant which is determined by an intensity distribution of the incident light and which is about 0.5 in the case of a Gaussian beam, $\lambda$ stands for the wavelength of the light source, and n stands for a refractive index of the transparent light converging medium 6. In the case of using a GaInAlP type red color laser (wavelength: 0.63 $\mu$m) as the light source and a heavy flint glass (n=1.83) as the transparent light converging medium 6, there is obtained about 0.2 $\mu$m as the diameter $D_{1/2}$ of the light spot 9a.

The shading film 7A, which is formed of titanium (Ti), has a thickness (say 10 nm) smaller than the wavelength of the laser beam and has the slit 7a formed in a position corresponding to the light spot 9a and extending in the direction Y perpendicular to the track direction X, to cut off light which emerges directly to the exterior from the light spot 9a, thereby forming a near-field light 9b through the slit 7a. Given that the width and length of the slit 7a are W and L, respectively, and the diameter of the light spot 9a is $D_{1/2}$, the following relationships are established between W, L and $D_{1/2}$:

$$W<D_{1/2} \text{ and } L>D_{1/2}$$

As a result there is formed a near-field light 9b having a length of about $D_{1/2}$ and the width W. In this embodiment the width W is set to several fractions of or less of the diameter $D_{1/2}$ of the light spot 9a, i.e., one tenth or so (say 50 nm) of the wavelength of the laser beam. The slit width W may be set smaller than 50 nm according to the development of the technique for attaining a high recording density of optical disks and of the slit forming technique. The shading film 7A may have been subjected to a treatment (say a blackening treatment) for absorbing the laser beam at its area located around the slit 7a, or it may be formed using a laser beam absorbing material, whereby it is possible to prevent a lowering of S/N ratio caused by the laser beam reflected around the slit 7a of the shading film 7A.

Since the width W of the slit 7a is as small as about one tenth of the wavelength of the laser beam, almost no propagation light emerges from the slit 7a, but even up to a proximate distance almost equal to the wavelength there leak out a near-field light 9b of about the same magnitude as the width W of the slit 7a in the track direction X and a near-field light 9b of a magnitude several times as large as the magnitude in the direction perpendicular thereto. If a medium having a refractive index almost equal to that of the transparent light converging medium 6, say, the optical disk 8, is disposed in proximity to the near-field light 9b, the light 9b will enter a recording layer 8a of the optical disk 8 as a propagation light, and with this incident light it becomes possible to record and read information to and from the recording layer 8a. The light quantity of this propagation light is represented by the following expression:

$$I = I_0 \times \iota^\infty \iota^a e^{-(x^2+y^2)/w^2} dx \cdot dy \qquad \text{[Expression 1]}$$

where,
- $I_0$: total power of the laser
- ω: radius of the light spot 9a on the surface 6b for focusing
- a: half width of the slit 7a That is, in the case of a red color laser, the quantity of the laser beam passing through the slit 7a is about 20% of the total power of the light spot 9a, and it is 30% in the case of blue light. Thus, the light converging efficiency can be improved 100 times or more as compared with that obtained using the conventional optical fiber.

Figure 2A:
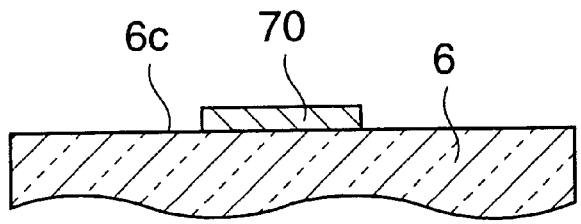
FIGS. 2A to 2D are diagrams showing how to form a light shading/reflecting film used in the first embodiment.
Figure 2B:
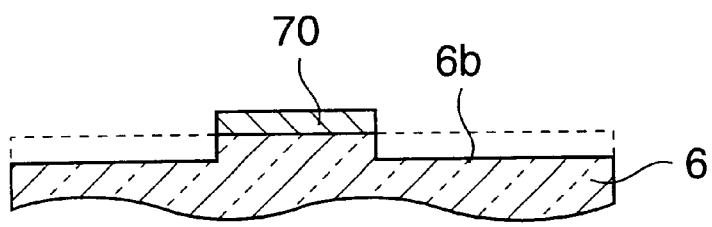
Figure 2C:
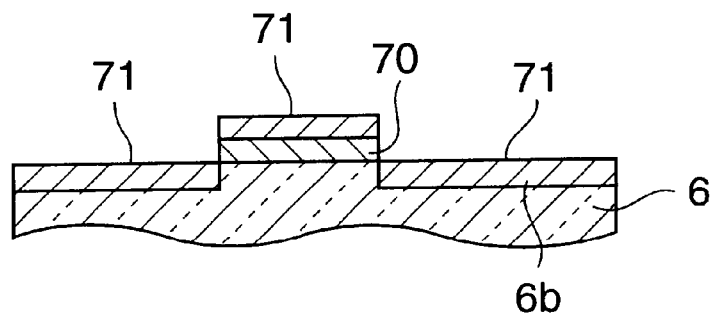
Figure 2D:
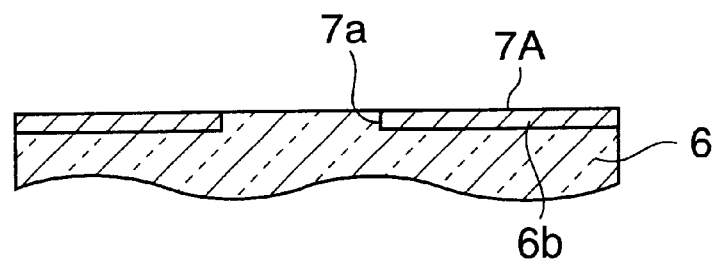

FIGS. 2A to 2D illustrate how to form the shading film on the surface 6b for convergence and how to form the slit 7a. First, a photoresist film 70 for electron beam exposure is applied to a bottom 6c of the transparent light converging medium 6, then exposure is made so that there remains a portion corresponding to the slit 7a (FIG. 2A), and after development, the bottom 6c is subjected to dry etching anisotropically to about 100 Å to form the surface 6b for focusing (FIG. 2B). As an etching gas there is used a $CF_4$-based gas. Next, Ti film 71 for shading light is formed about 100 Å throughout the whole surface by sputtering (FIG. 2C) and thereafter the photoresist film 70 is melted to lift off the Ti film portion 71 corresponding to the slit 7a (FIG. 2D). In this way the shading film 7A having the slit 7a is formed. The shading film 7A is not limited to the titanium film, but another film may be used insofar as the film used has a light shading property and an excellent adherability to glass.

The operation of the optical head 1 will now be described. When the laser beam 3a is emitted from the semiconductor laser 2, the laser beam 3a is shaped into the collimated beam 3b by the collimator lens 4, then is folded mirror at right angles by the folding mirror 5, and enters a light converging type hologram 10A. The collimated beam 3c thus incident on the hologram 10A is converged into the convergent beam 3d, which forms the light spot 9a on the surface 6b for focusing of the transparent light converging medium 6. The laser beam 3d thus converged into the light spot 9a on the surface 6b for convergence passes through the slit 7a of the shading film 7A and leaks out as the near-field light 9b to the exterior of the transparent light condensing medium 6. The recording layer 8a, which is formed on a plastic substrate 8b of the optical disk 8, is irradiated with the near-field light 9b, whereby information is recorded or reproduced. The surface 6b for focusing is also used as a slider surface for flying travel on the optical disk 8. The flying height is several ten to 200 nm though depending on the wavelength of light and the spot light diameter.

The above construction can afford the following effects:

(a) Since the hologram 10A is used, the collimated can directly be converged without using an objective lens and therefore it is possible to reduce the height of the optical head.

(b) Since the hologram 10A is used, the beam can be converged at a high NA value, and even if there is used a light source of red color, there is obtained a very small spot of 0.2 μm.

(c) By using a laser having little wavelength dependence as the light source, it is possible to eliminate the problem of chromatic aberration even in the use of the hologram for light convergence, and it is no longer required to use an auto-focusing control mechanism, thus making it possible to provide a small-sized optical head. As a result, when several optical disks are used in a stacked state, it is possible to narrow the disk spacing and hence possible to stack a large number of disks, thus permitting the attainment of a large capacity. In addition, since the whole of the optical disk drive can be made thin, it is possible to attain the reduction of size in the case of using the optical disk drive as a memory for a portable terminal.

(d) Since the near-field light 9b leaking out from the very small light spot 9a is throttled by the slit 7a formed in the shading film 7A and extending in the direction Y perpendicular to the track direction X, the width in the track direction X of the near-field light 9b can be reduced to one per several in comparison with that in the conventional light convergence using Super SIL and therefore the recording density in the track direction X can be increased to several times.

(e) The length in the direction Y perpendicular to the track direction X of the near-field light 9b depends on the spot diameter, but since the spot diameter can be made very small as noted above, the track pitch can also be diminished.

(f) By using the surface 6b for focusing also as a slider surface for flying travel, the optical head structure can be simplified and it becomes possible to attain a further reduction of size and cost.

Figure 3A:
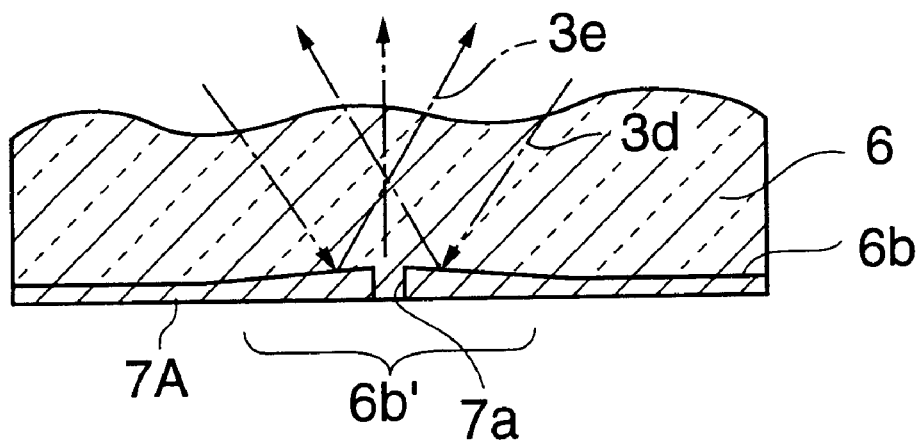
FIGS. 3A and 3B are diagrams showing modified examples of light shading/reflecting films related to the first embodiment.
Figure 3B:
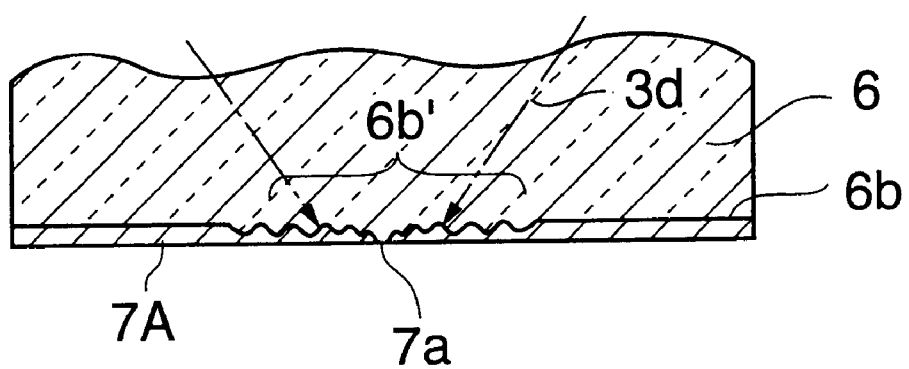

FIGS. 3A and 3B show modified examples of the shading film 7A. As shown in FIG. 3A, at the time of etching the bottom of the transparent light converging medium 6, the surface to be etched may be inclined relative to the incident light into a convex or concave conical surface, for example, by tilting an area 6b' located near the slit 7a formed in the surface 6b for focusing. Alternatively, as shown in FIG. 3B, at the time of etching the bottom of the transparent light converging medium 6, fine concaves and convexes may be formed on the surface to be etched, for example, by conducting the etching at high speed using a relatively large electric current. If the reflectance of the area 6b' located near the slit 7a of the shading film 7A is high, the intensity of light reflected by the shading film 7A becomes stronger than that of a signal light which returns from the slit 7a, bringing a result that it is no longer possible to ensure a large amplification factor in pre-stage amplification during signal processing, and therefore the S/N ratio decreases. On the other hand, if the absorbance in the shading film 7A is high, the temperature of the shading film 7A will rise at the portion thereof to which the light spot 9a has been radiated and the heat generated will affect the recording. This is not desirable. In view of this point, by adopting such a structure as shown in FIG. 3A or 3B, a reflected beam 3e will not return to the collimator lens 4 side, whereby the S/N ratio can be improved. On the other hand, the reflected beam which passes through the slit 7a travels along the same route as that of the incident beam 3d and enters a photodetector (not shown), whereby the proportion of stray light can be decreased. Consequently, it is possible to increase the amplification factor of a DC type preamplifier and hence possible to improve the S/N ratio.

Figure 4A:
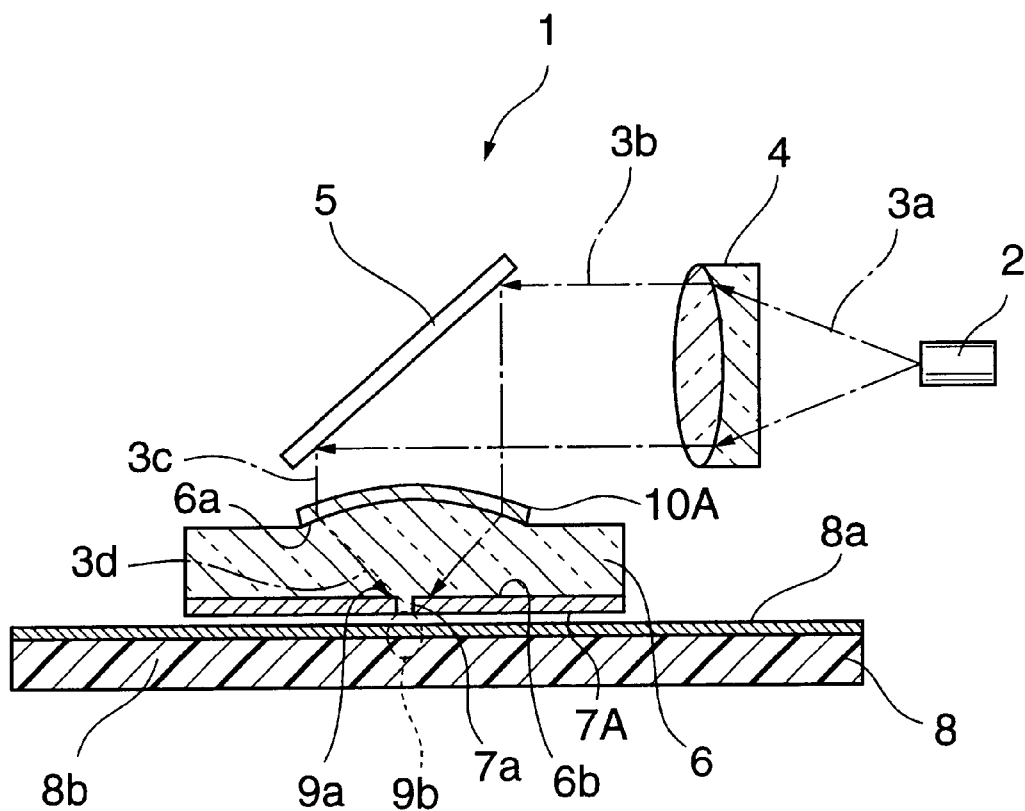
FIG. 4A is a diagram showing a principal portion of an optical head according to the second embodiment of the present invention and FIG. 4B is a bottom view thereof.
Figure 4B:
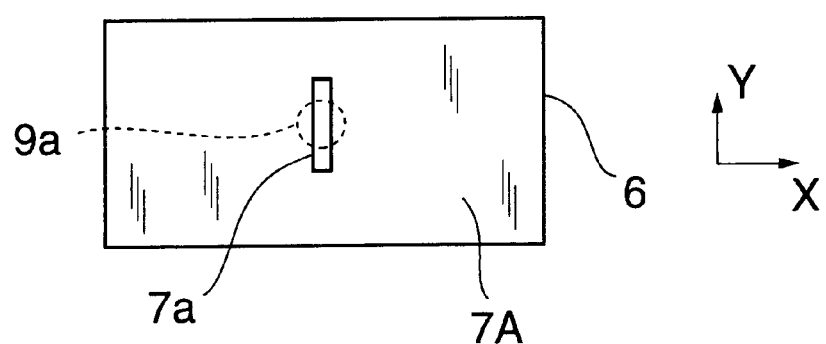

FIGS. 4A and 4B illustrate an optical head according to the second embodiment of the present invention. This optical head, indicated at 1, is of the same construction as the first embodiment except that the incident surface 6a is formed in a convex shape. With such a convex incident surface 6a, the laser beam is converged by both the surface 6a and the light converging type hologram 10A, and since chromatic aberrations of the two are opposite with respect to the wavelength, it is possible to offset wavelength variations of the two, thus permitting the use of even such a laser of a large wavelength variation as an end-face emitting laser without making auto-focusing control.

Figure 5A:
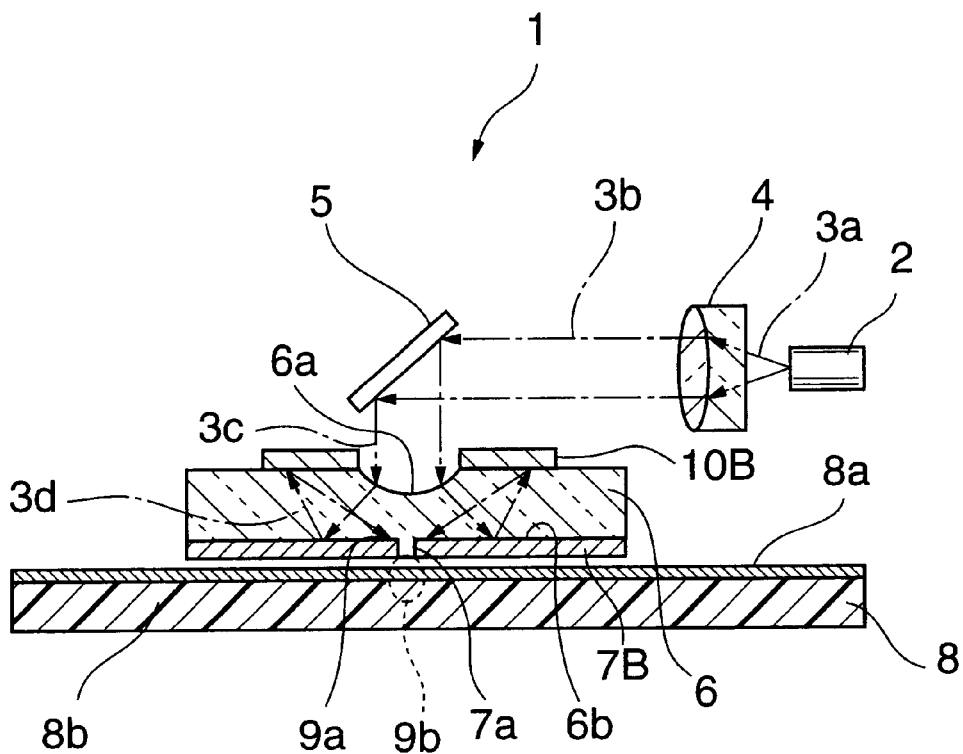
FIG. 5A is a diagram showing a principal portion of an optical head according to the third embodiment of the present invention and FIG. 5B is a bottom view thereof.
Figure 5B:
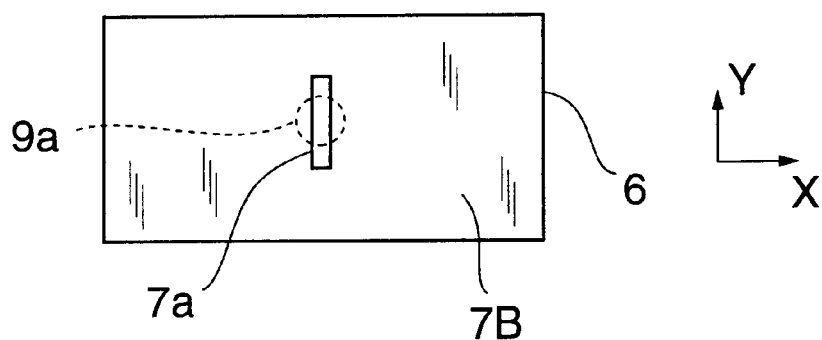

FIGS. 5A and 5B illustrate an optical head according to the third embodiment of the present invention. In this optical head, indicated at 1, the light introducing function and the light converging function of the incident surface 6a in the first embodiment are separated from each other. The incidence surface 6a is formed in a spherical concave shape and incident beam 3d is refracted and expanded by the spherical concave-shaped incident surface 6a, then is reflected by a light shading/reflecting film 7B and is further reflected and converged by a reflective surface 6d with a reflective hologram 10B formed around the incident surface 6a, to form a light spot 9a on a surface 6b for focusing. In this case, if the numerical aperture, NA, of the reflective hologram 10B is set equal to the NA at the incident surface 6a used in the first embodiment, the diameter of a collimated beam 3c can be reduced to a half or less, so that other optical system components, including a folding mirror 5, can be reduced in size and it is possible to reduce the size of the optical head.

Figure 6A:
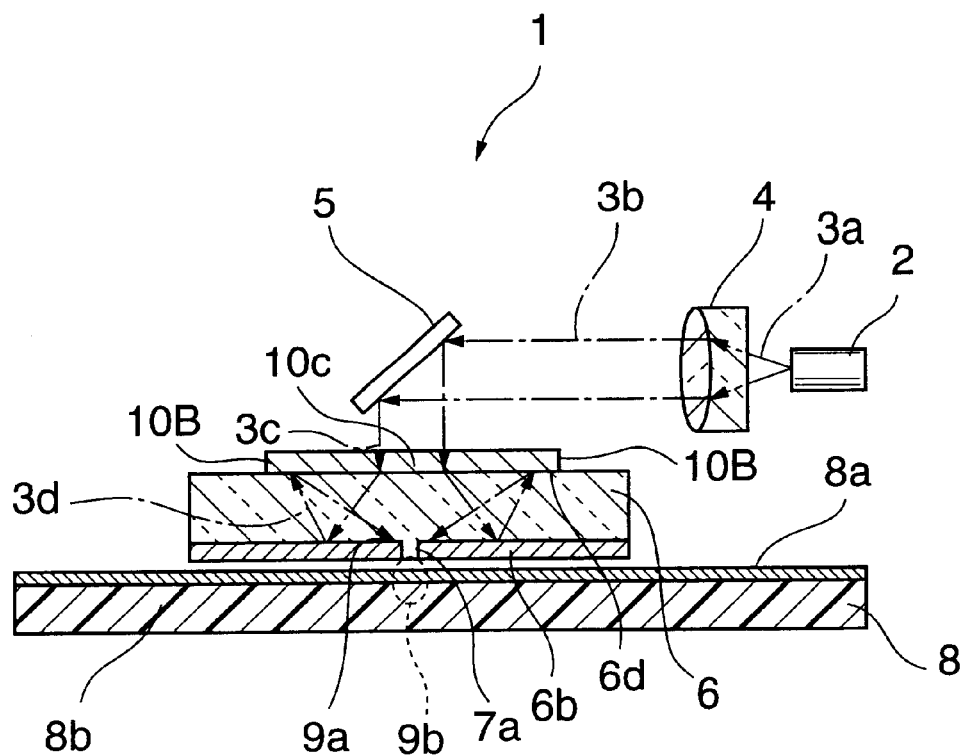
FIG. 6A is a diagram showing a principal portion of an optical head according to the fourth embodiment of the present invention and FIG. 6B is a bottom view thereof.
Figure 6B:
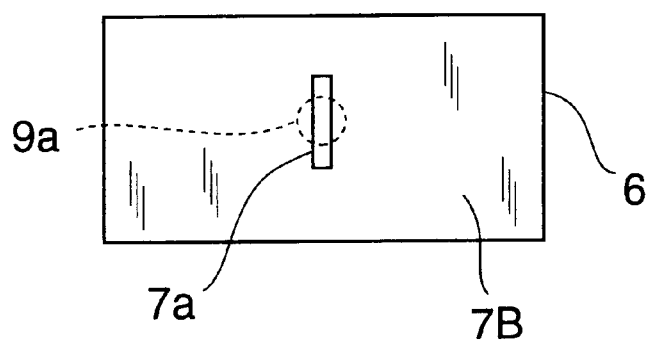

FIGS. 6A and 6B illustrate an optical head according to the fourth embodiment of the present invention. This optical head, indicated at 1, is of the same construction as in the third embodiment except that the function of the spherical concave-shaped incident surface 6a is substituted by a planar diffusion type hologram 10C. Such a substitution permits offset in chromatic aberration of both the diffusion type hologram 10C and the reflective hologram 10B, and it is possible to realize a light converging optical head of reduced wavelength dependence. Even with use of a laser large in wavelength variation such as an end-face emitting laser, it is possible to converge the laser beam without making auto-focusing control.

Although in the above embodiments the transparent light converging medium 6 is formed flat on its side opposed to the optical disk 8, there may be formed a difference in height insofar as the laser beam is focused to form a light spot on one side of the transparent light converging medium 6.

Figure 7A:
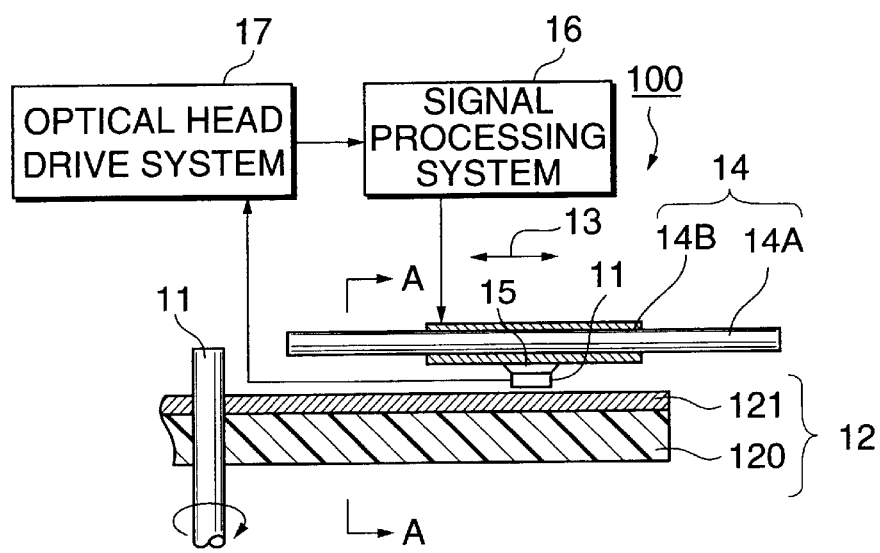
FIG. 7A is a diagram showing an optical disk drive according to the first embodiment of the present invention and FIG. 7B is a sectional view taken on line A—A in FIG. 7A.
Figure 7B:
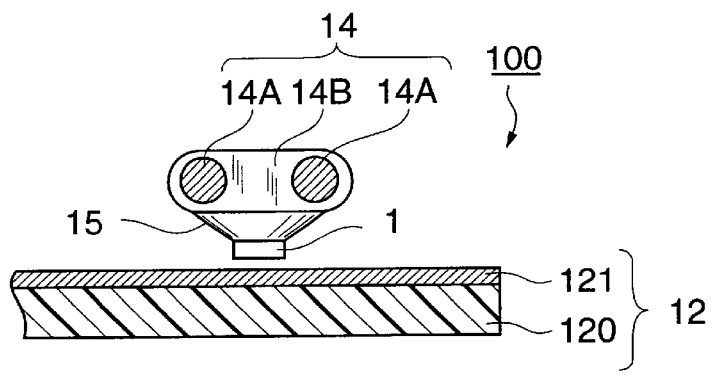

FIG. 7A illustrates an optical disk drive according to the first embodiment of the present invention and FIG. 7B is a sectional view taken on line A—A in FIG. 7A. This optical disk drive, indicated at 100, comprises an optical disk 12 adapted to rotate through a rotary shaft 11 by means of a motor (not shown) the optical disk 12 comprising a plastic disk 120 and a recording layer 121 formed using a phase change material of GeSbTe on one side of the plastic disk 120; an optical head 1 which performs optical recording and optical reproduction for the recording layer 121 of the optical disk 12; a linear motor 14 which causes the optical head 1 to move in a tracking direction 13; a suspension 15 which supports the optical head 1 from the linear motor 14 side; an optical head drive system 16 which drives the optical head 1, and a signal processing system 17 which processes a signal provided from the optical head 1 and which controls the optical head drive system 16. The linear motor 14 comprises a pair of fixed portions 14A positioned in the tracking direction 13 and a moving coil 14B adapted to move on the paired fixed portions 14A. The optical head 1 is supported by the suspension 15 from the moving coil 14B side.

Figure 8:
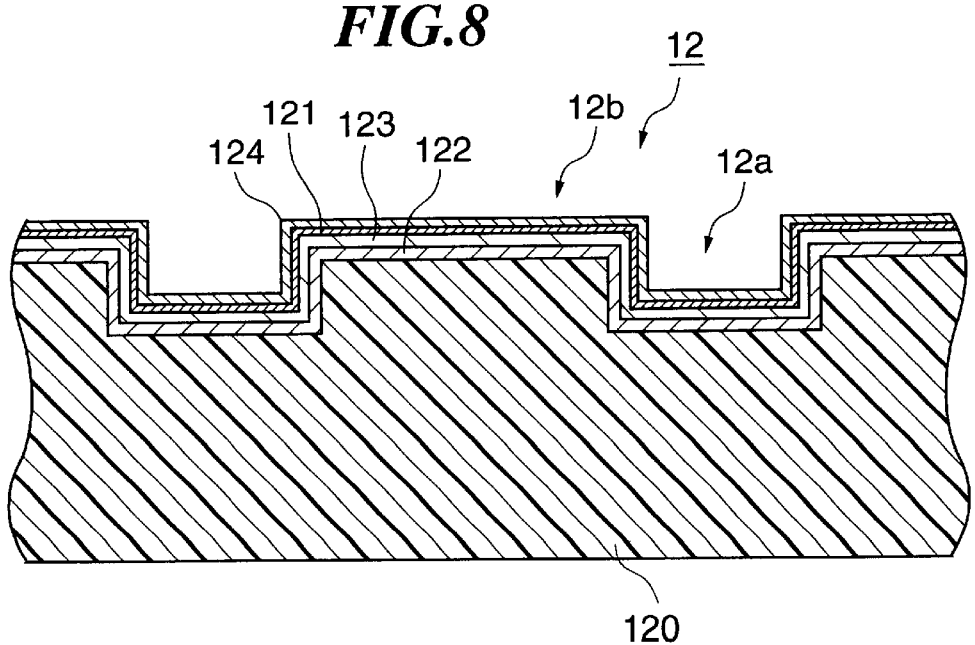
FIG. 8 is a sectional view showing the details of an optical disk used in the first embodiment.

FIG. 8 shows the details of the optical disk 12. The optical head 12 is constructed so as to attain a high recording density to deal with microminiaturization of a light spot 9a formed by the optical head 1. As the plastic disk 120 there is used a polycarbonate disk for example and groove portions 12a are formed in one side of the disk. In the optical disk 12, a reflective Al film layer (100 nm thick) 122, an $SiO_2$ layer (100 nm thick) 123, a recording GeSbTe layer (15 nm thick) 121, and a protective SiN layer (50 nm thick) 124 are laminated onto the plastic disk 120 on the side where the groove portions 12a are formed. In this embodiment, information is recorded on the land portions 12b and the track pitch is set at 0.25 $\mu$m and the depth of each groove portion 12a is set at about 0.1 $\mu$m. Mark length is 0.13 $\mu$m and recording density is 19 Gbits/inch$^2$, corresponding to a storage capacity of 27 GB in a 12 cm disk. Thus, the recording density could be made as high as 7.6 times the recording density obtained in the prior art.

Figure 9A:
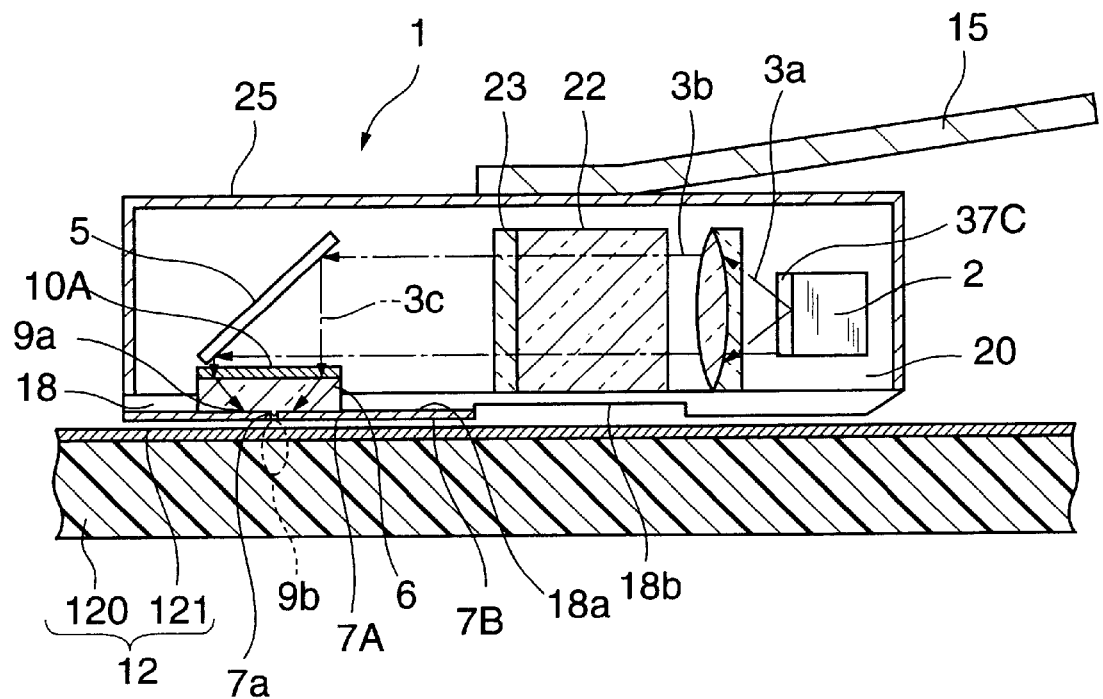
FIG. 9A is a longitudinal sectional view of an optical head used in the first embodiment and FIG. 9B is a transverse sectional view thereof.
Figure 9B:
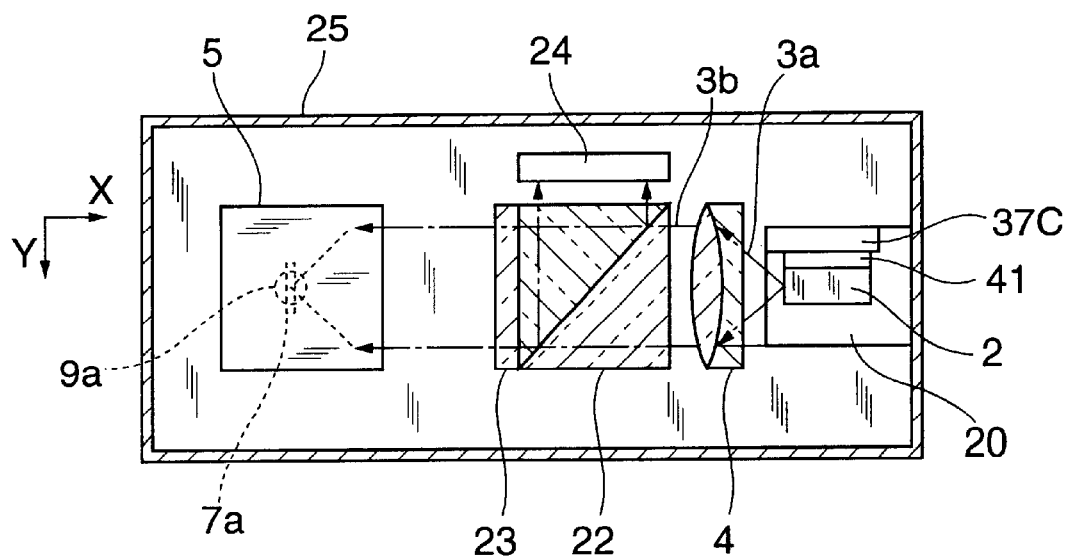

FIG. 9 illustrates the optical head 1 used in the optical head unit 100, in which FIG. 9A is a side view thereof and FIG. 9B is a plan view thereof. The optical head 1 has a flying slider 18 which fliess on the optical disk 12. On the flying slider 18 are disposed an end-face emitting semiconductor laser 2 formed of, say, AlGAlnP and which emits a laser beam 3a having a wavelength of 630 nm, a collimator lens 4 which shapes the laser beam 3a emitted from the semiconductor laser 2 into a collimated beam 3b, a holder 20 constituted by a fused quartz plate and which is for mounting the semiconductor laser 2 onto the flying slider 18, a holder 37C which holds the semiconductor laser 2 through a piezoelectric element 41, a polarization beam splitter 22 which separates the collimated beam 3b emitted from the semiconductor laser 2 and the reflected light from the optical disk 12 from each other, a quarter-wave plate 23 which makes a linearly polarized light of the collimated beam 3b from the semiconductor laser 2 into a circularly polarized light, a folding mirror 5 which turns down the collimated beam 3b from the quarter-wave plate 23 at right angles toward the optical disk 12, a transparent light converging medium 6 with a light converging hologram 10A formed on its incident surface 6a, and a photodetector 24 mounted on the flying slider 18 and which receives the reflected light from the optical disk 12 through the beam splitter 22. All of these components are accommodated in a head case 25, which case is fixed to a lower end of the suspension 15.

For example, the transparent light converging medium 6 is formed using a heavy flint glass having a refractive index, n, of 1.91 and is 1 mm high by 2 mm long. Although the transparent light converging medium 6 also has the incident surface 6a like the transparent light converging medium 6 shown in FIG. 1, the flying slider 18 is constituted by a transparent medium having a refractive index equal to that of the transparent light converging medium 6 so that a surface 18a for focusing of the flying slider 18 corresponds to a surface 6b for focusing, with the light spot 9a being formed on the surface 18a for convergence of the flying slider 18. On the surface 18a of the flying slider 18 is formed a shading film 7A having a slit 7a like that shown in FIG. 1. The slit 7a is formed in such a manner that its longitudinal direction is the direction Y perpendicular to the track direction X, as shown in FIG. 9B.

As shown in FIG. 9A, the flying slider 18 is formed with a groove 18b so that a negative pressure is developed at the other portion than the portion around the light spot 9a formed on the surface 18a for focusing. Under the action of both the negative and positive pressure induced by the groove 18b and the resilience of the suspension 15 the spacing between the flying slider 18 and the optical disk 12 is maintained constant as a flying quantity, which is about 0.06 μm in this embodiment.

At the time of recording, the optical head drive system 16 modulates the emitted beam from the semiconductor laser with a recording signal, causes a phase change to be induced between crystal phase and amorphous phase, and records it as a difference in reflectance during the period concerned, while at the time of reproduction, the beam from the semiconductor laser 2 is allowed to be emitted continuously without modulation and the above difference in reflectance in the recording layer 121 is detected as a variation of reflected light by the photodetector 24.

On the basis of the reflected light from the optical disk 12 detected by the photodetector 24 the signal processing system 17 produces an error signal for tracking control and a data signal, which error signal is passed through a high pass filter and a low pass filter to form an error signal of a high frequency region band and an error signal of a low frequency band. Then, on the basis of these error signals a tracking control is made for the optical head drive system 16. The tracking error signals are here produced by a sample servo method (optical Disk Technology, Radio Technology Co., p. 95). According to this sample servo method, zigzag marks (Wobbled marks) are provided intermittently on the track and error signals are produced on the basis of variations in reflection intensity from those marks. In this method, recording signals and tracking error signals are separated from each other time-divisionally, so the separation of the two is performed by a gate circuit in a reproducing circuit. Error signals may be produced by a push-pull method which utilizes interference with the reflected light from the groove portions 12a.

Figure 10:
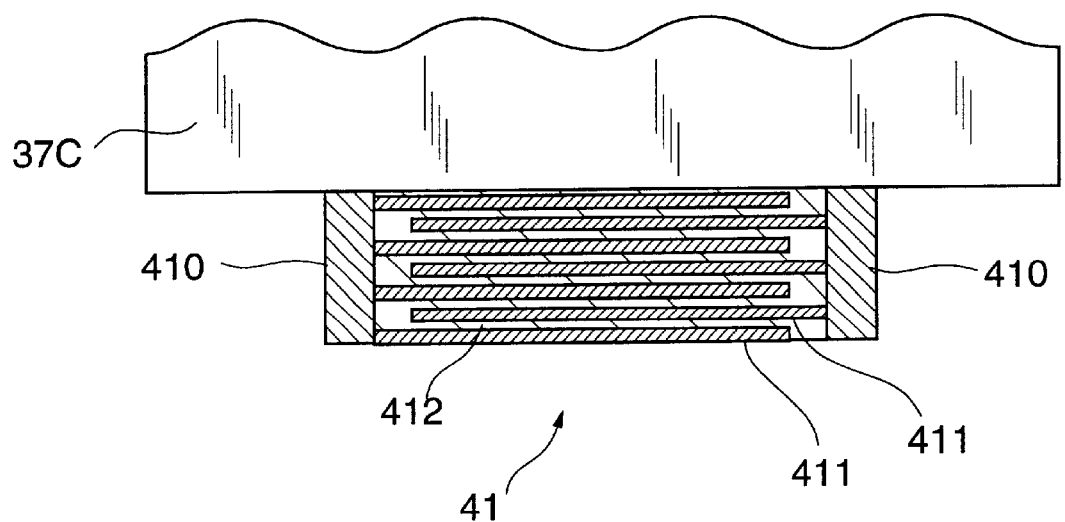
FIG. 10 is a sectional view of a piezoelectric element used in the first embodiment.

FIG. 10 illustrates a piezoelectric element 41. The piezoelectric element 41 comprises plural electrode films 411 connected to a pair of electrode terminals 410 and multilayer PZT thin films (about 20 μm thick) 412 formed between adjacent electrode films 411. With the piezoelectric element 41, which is formed on the holder 37C, the transparent light converging medium 6 is supported and the disk is scanned in the direction Y (tracking direction) perpendicular to the track direction X.

The operation of the optical disk drive 100 of the above first embodiment will now be described. The optical disk 12 is rotated at a predetermined speed by means of a motor (not shown). The flying slider 18 travels while flying on the optical disk 12 under the action of both a negative and positive pressure generated by the rotation of the optical disk 12 and the resilience of the suspension 15. When the laser beam 3a is emitted from the semiconductor laser 2 by operation of the optical head drive system 16, the emitted beam 3a from the semiconductor laser 2 is shaped into a collimated beam 3b by the collimator lens 4. The collimated beam 3b passes through the polarization beam splitter 22 and the quarter-wave plate 23, then is folded mirror by the folding mirror 5 and enters the light converging type hologram 10A. During passage through the quarter-wave plate 23 the collimated beam 3b is converted from a linearly polarized light to a circularly polarized light by the quarter-wave plate. The circularly polarized, collimated beam 3b thus incident on the light converging type hologram 10A becomes a convergent beam, which is focused on the surface 18a of the flying slider for focusing, whereby a very small light spot 9a is formed on the surface 18a. A portion of the light spot 9a leaks as the near-field light 9b to the exterior of the underside of the flying slider 18 through the slit 7a present under the light spot. The near-field light 9b is propagated to the recording layer 121 of the optical disk 12 to effect optical recording or reproduction. The reflected light from the optical disk 12 travels reverse along the incident light path and is reflected in a 90° direction by the polarization beam splitter 22, then enters the photodetector 24. On the basis of the reflected light from the optical disk 12 incident on the photodetector 24 the signal processing system 17 produces an error signal for tracking control and a data signal and performs a tracking control for the optical head drive system 16 on the basis of the error signal.

According to the optical disk drive 100 of the above first embodiment, the NA value of the beam converged by the transparent light converging medium 6 becomes 0.86, thus affording a very small light spot 9b having a diameter $D_{1/2}$ of about 0.2 μm, about 20% of which can be directed as the near-field light 9b to the recording layer 121 of the optical disk 12 through the slit 7a which is about 50 nm wide. Thus, it becomes possible to effect optical recording and reproduction at an ultra-high density (60 Gbits/inch$^2$)

In addition, since recording and reproduction can be done without making auto-focusing control, it is no longer required to use an auto-focusing control mechanism and therefore it is possible to greatly decrease the weight of the optical head 1 and attain the reduction of its size. More particularly, the size of the optical head 1 was reduced to 2 mm high, 3 mm wide and 6 mm long and its weight became as light as 0.2 g. As a result, the weight of moving components, including the moving coil 14B of the linear motor 14 and the suspension 15 could be reduced to 2.0 g or less. With the linear motor 14 alone, there were obtained a frequency band of 50 kHz or more and a gain of 60 dB or more. Thus, tracking can be done at a revolution of 600 rpm and there was obtained an average transfer rate of 60 Mbps.

Moreover, since the recording signal and the tracking error signal are time-divisionally separated from each other by adoption of the sample servo method, it is not necessary for the photodetector 24 to be a divided type. For example, there may be used a PIN photodiode of 1 mm square. Since the photodetector 24 is not required to be a divided type, the detection system can be greatly simplified in structure and reduced in weight.

Since the weight of the transparent light converging medium 6 is 5 mg or less and thus it is light, the resonance frequency of the system which supports the transparent light converging medium 6 can be set at 300 kHz or higher and a displacement of 0.5 μm or more could be obtained at a voltage of 5V applied between the electrode terminals 410.

By the two-stage control using the piezoelectric element 41 and the linear motor 14 there were obtained a frequency band of 300 kHz and a gain of 80 dB, and tracking could be done with an accuracy of 5 nm under high-speed revolution (3,600 rpm). As a result, in this embodiment the transfer rate could be increased to six times the rate obtained in the optical disk drive 100 not using the piezoelectric element 100, i.e., 360 Mbps.

Further, when a multi-beam optical head to be described later was used, an eight-fold increase resulted and there was obtained a transfer rate of nearly 500 Mbps. In the use of a 12 cm disk there was attained an average seek speed of 10 ms or less. Consequently, the access time at 3,600 rpm is 20 ms or less.

Although in the above embodiment the sample servo method is adopted to generate an error signal for tracking control, there may be adopted a wobbled track method wherein the recording track is wobbled periodically and the resulting modulation of reflected light is detected in synchronism with the wobbling frequency to produce the error signal.

For tracking a disk exclusive for reproduction there may be adopted a three-spot method which has been applied to a compact disk (CD). More particularly, a diffraction grating is inserted between the collimator lens 4 and the polarization beam splitter 22, beam detecting elements for detecting reflected beams of ± first order beams from the disk are disposed on both sides of a main beam detecting element, and a difference between their outputs is calculated, whereby it becomes possible to produce an error signal.

It is also possible to make a push-pull type control involving detecting a right-left imbalance of a diffracted light from a side portion of the recording track and producing an error signal. In this case, the diffracted light is introduced into a two-split type beam detecting element and a differential output error signal is produced.

The optical head 1 used in this embodiment can be applied as it is to recording and reproduction for a writing once optical disk (a disk formed with uneven bits by light absorption of a colorant).

Further, by mounting a thin-film coil around the light spot 9a formed on the surface 18a of the flying slider 18 and by performing magnetic field modulation, it becomes possible to effect magneto-optic recording with use of a magneto-optic medium. In reproduction, however, since the rotation of a light polarization plane is detected by polarization analysis to produce a signal, it is necessary that the polarization beam splitter 22 be substituted by a non-polarization splitter and that an analyzer be disposed before a light detecting element.

Although in this embodiment an end-face emitting laser is used as the laser beam source, a vertical cavity surface emitting laser (VCSEL) may also be used. In the case of a surface emitting laser, a maximum output of a basic mode (TEM00) is about 2 mW, which is less than one tenth of that in the end-face emitting laser. But in this embodiment the light spot diameter is reduced to one per several in comparison with that used in the conventional optical disk drive, so that the light intensity can be made ten times or more higher, thus permitting the use of even a surface emitting semiconductor laser in recording. In addition, the surface emitting semiconductor laser scarcely undergoes any wavelength variation caused by temperature and it is possible to make the correction of chromatic aberration unnecessary.

Although in this embodiment a piezoelectric element is used for driving the light spot, this constitutes no limitation. There may be used such a beam scannable semiconductor laser as shown in FIG. 14 which will be referred to later.

Figure 11:
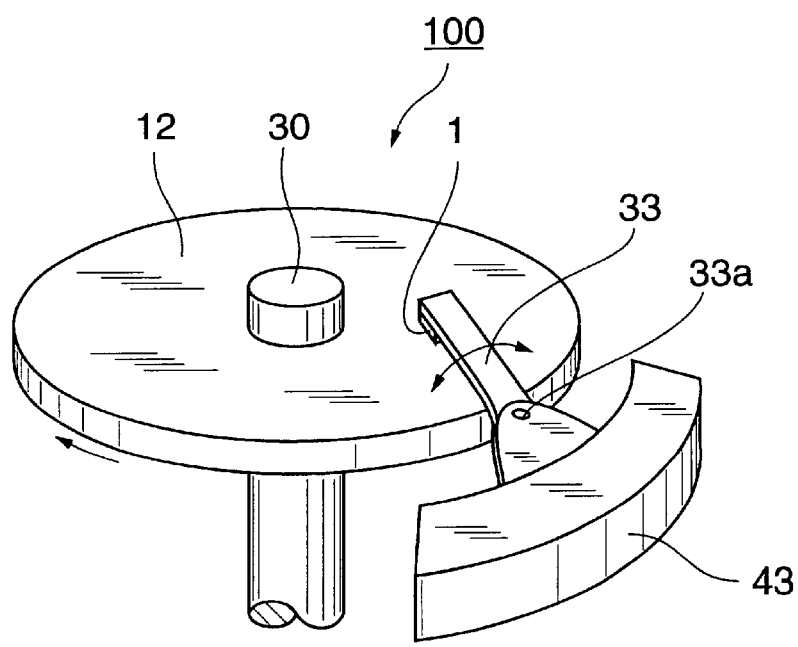
FIG. 11 is a perspective view of an optical disk drive according to the second embodiment of the present invention.

FIG. 11 illustrates an optical disk drive according to the second embodiment of the present invention. Although the linear motor 14 is used for seek operation in the previous first embodiment, a rotary linear motor 43 used for a hard disk is used in this second embodiment. An optical head 1 is connected to the rotary linear motor 43 through a suspension 33 which is supported pivotably by a pivot shaft 33a. According to this construction, the rotary linear motor 43 can be disposed outside an optical disk 12, so that the optical head 1 can be made smaller in thickness and the whole of the optical disk drive, indicated at 100, can be reduced in size. Consequently, the optical disk can be rotated at a high speed (3, 600 rpm), making it possible to attain a data transfer rate of 360 Mbps or more on the average.

Figure 12:
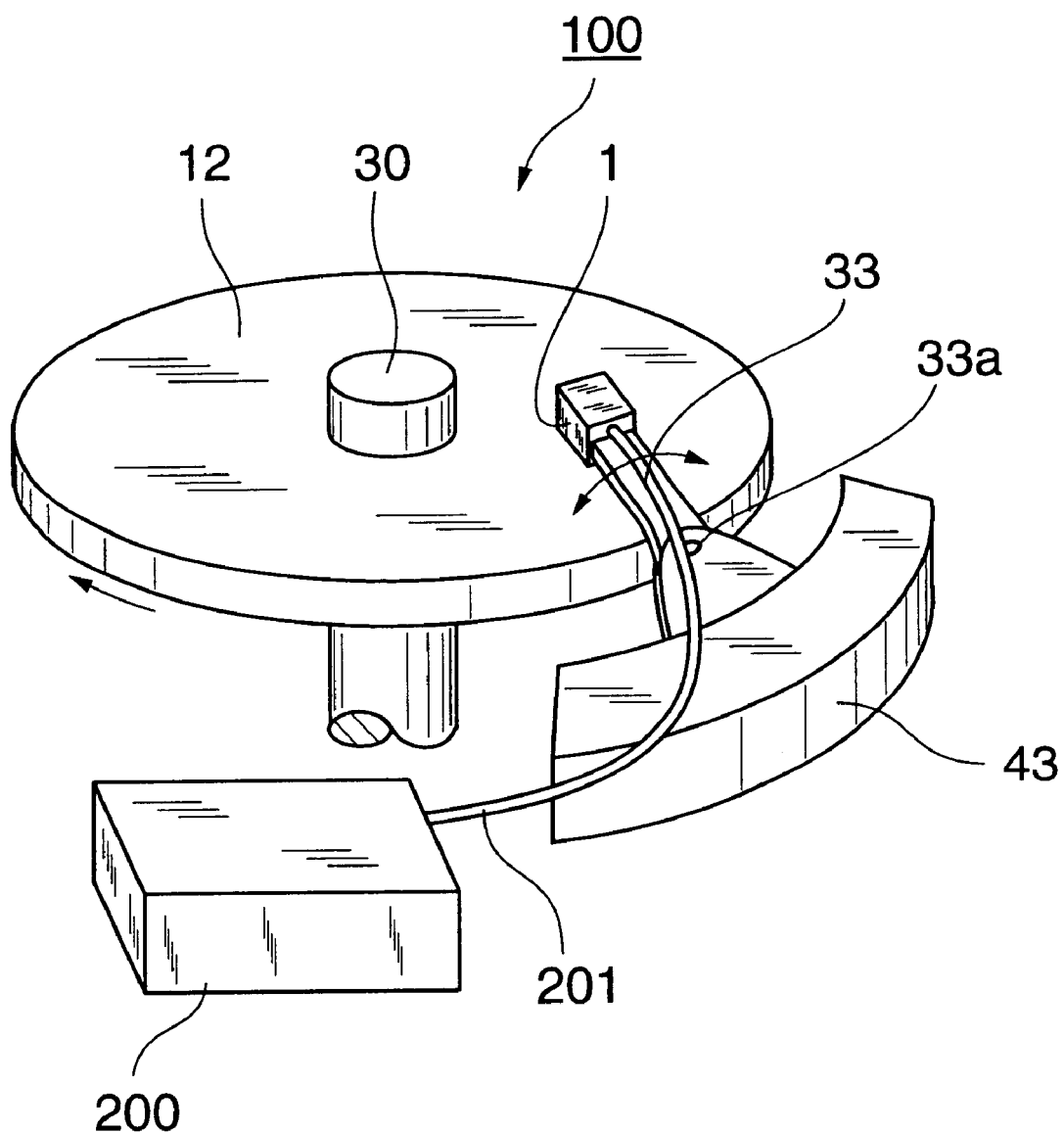
FIG. 12 is a perspective view of an optical disk drive according to the third embodiment of the present invention.

FIG. 12 illustrates an optical disk drive according to the third embodiment of the present invention. This optical disk drive, indicated at 100, is different from the optical disk drive of the previous second embodiment in that a laser beam generating system comprising a semiconductor laser 2, a collimator lens 3, a holder 37C and a piezoelectric element 41 and a light detecting system comprising a beam splitter 22, a quarter-wave plate 23 and a photodetector 24 are separated from the optical head 1 and are disposed within a fixed unit 200 and that the optical head 1 and the fixed unit 200 are optically connected with each other through an optical fiber 201.

According to the optical disk drive 100 of this third embodiment, the distance from the optical fiber 201 to the surface for focusing is as short as 1 mm or so and thus in this section there scarcely occurs any out-of-focus condition caused by thermal expansion or shrinkage. In addition, the width in the track direction of the near-field light is kept constant by the slit width, with little influence of temperature variation. Therefore, an auto-focusing control can be omitted.

In this third embodiment, moreover, since the laser beam generating system and the light detecting system are separated from the optical head 1 in the second embodiment, the size of the optical head 1 is reduced to a height of 1 mm and a length and a width of 2 mm, and the weight thereof is reduced to about 10 mg. With use of such an ultra-light and thin optical head 1, it becomes possible to effect high-speed tracking by the rotary linear motor 43 and hence possible to provide a small-sized optical disk drive of a high transfer rate.

It is also possible to constitute this optical disk drive as a stack type like that shown in FIG. 13 which will be referred to later and thereby provide an optical disk drive of a large capacity.

For performing a high-speed tracking, a piezoelectric element (not shown) may be attached to the suspension 33 to drive the front end portion of the suspension 33 and the optical head.

Figure 13:
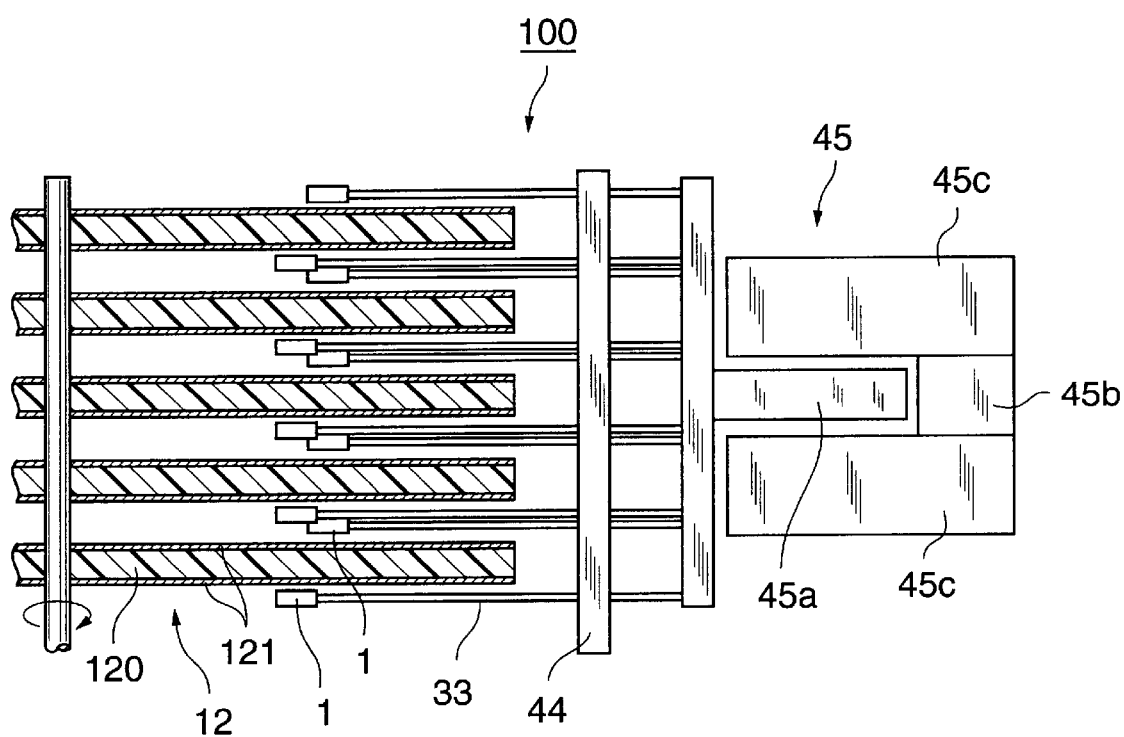
FIG. 13 is a sectional view of an optical disk drive according to the fourth embodiment of the present invention.

FIG. 13 illustrates an optical disk drive according to the fourth embodiment of the present invention. This optical disk drive is a disk stack type optical disk drive in which five optical disks are stacked and the optical head 1 using the transparent light converging medium 6 shown in FIG. 1 is used. More specifically, the optical disk drive 100 comprises five optical disks 12 each formed by a plastic substrate 120 and recording layers 121 formed respectively on upper and lower surfaces of the plastic substrate 120, ten optical heads 1 adapted to fly and seek on the recording layers 121 of the optical disks 12, suspensions 33 which support the optical heads 1 pivotably through a pivot shaft 44, and a rotary linear motor 45 which drives the suspensions 33. It is optional whether each recording layer 121 is to be a layer of a phase change type medium or a magneto-optic type medium. The rotary linear motor 45 comprises a movable piece 45a with the suspension 33 connected thereto and a pair of electromagnets 45c which are connected together through a yoke 45b and which actuate the movable piece 45a. This optical head 1 basically uses the same transparent light converging medium 6A and AlGaInN-based laser (630 nm) as in FIG. 9 and the diameter of a light spot formed thereby is 0.2 μm. The disk diameter is 12 cm and the track pitch and mark length are 0.2 μm and 0.05 μm, respectively. The capacity of one side is 100 GB and the total capacity is 1 TB.

Figure 14A:
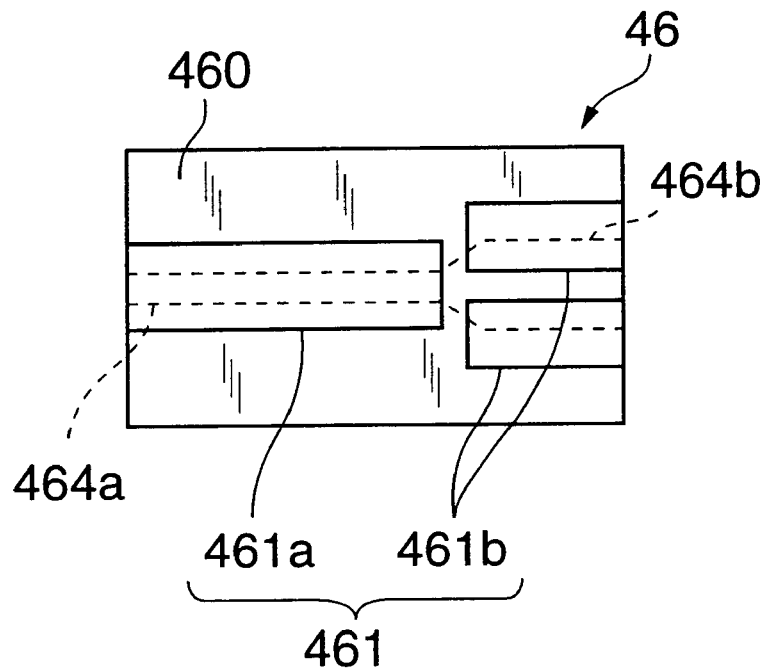
FIG. 14 is a diagram showing a semiconductor laser used in the fourth embodiment.
Figure 14B:
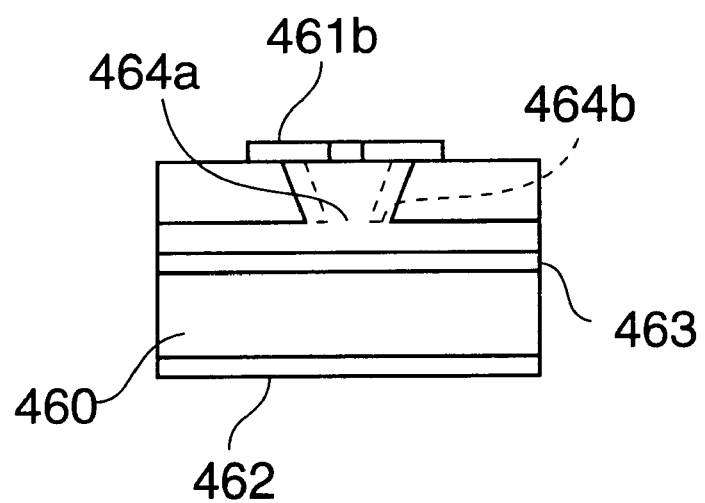

FIGS. 14A and 14B illustrate a semiconductor laser used in this fourth embodiment. This semiconductor laser, indicated at 46, is a beam scannable semiconductor laser and has a substrate 460. On the upper and lower surfaces of the substrate 460 are formed an upper electrode 461 and a lower electrode 462, respectively, with an active layer 463 being formed centrally. In an oscillating constriction of the active layer 463 the widths of a main portion 464a and a front end portion 464b are 3 μm and 5 μm, respectively, while the lengths thereof are 300 μm and 50 μm, respectively. The upper electrode 461 comprises a main electrode 461a and a pair of right and left front-end electrodes 461b. An oscillating portion of the active layer 463 is constricted by the main portion 464a and front end portion 464b of the oscillating constriction, and by allowing an electric current to flow in the front-end electrodes 461b in a divided or alternate manner, an output light beam is scanned right and left. It is possible to set the scanning width and frequency up to 1 μm and 30 MHz, respectively. A two-stage tracking control was carried out by so scanning the laser beam and by using the linear motor 45. For the generation of an error signal for tracking control there was adopted a laser beam wobbling method. More specifically, by scanning the laser beam 0.03 μm right and left at a high speed (10 MHz), a light spot on the recording surface is wobbled about 0.01 μm in proportion to the NA ratio between the collimator lens 4 and the transparent light converging medium 6. As a result, a reflected signal from the recording track is modulated and this modulated signal is detected in synchronism with the scanning frequency, whereby an error signal is generated.

According to the optical disk drive 100 of this fourth embodiment it is possible to attain a large capacity of 15 TB because information can be recorded. As the optical head 1 there may be used any of those shown in FIGS. 3 to 6, whereby the height of the optical head 1 can be reduced to 3 mm or less and hence it is possible to reduce the height of the optical disk drive and increase the volume capacity.

Figure 15A:
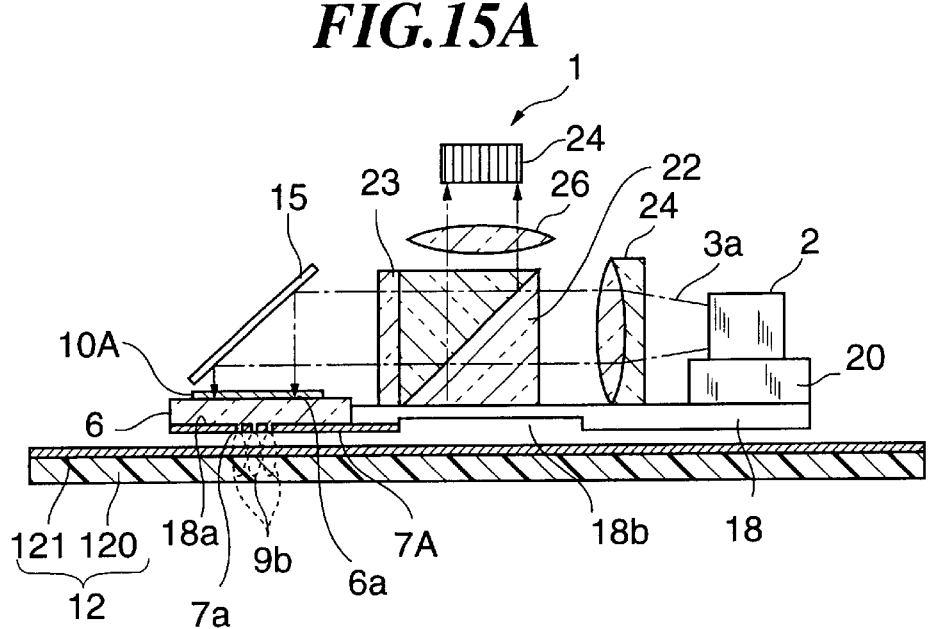
FIG. 15A is a diagram showing a principal portion of an optical disk drive according to the fifth embodiment of the present invention.
Figure 15B:
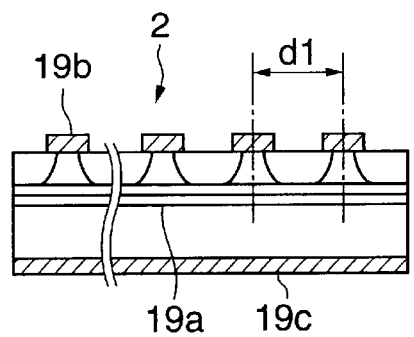
FIG. 15B is a diagram showing a semiconductor laser used therein.
Figure 15C:
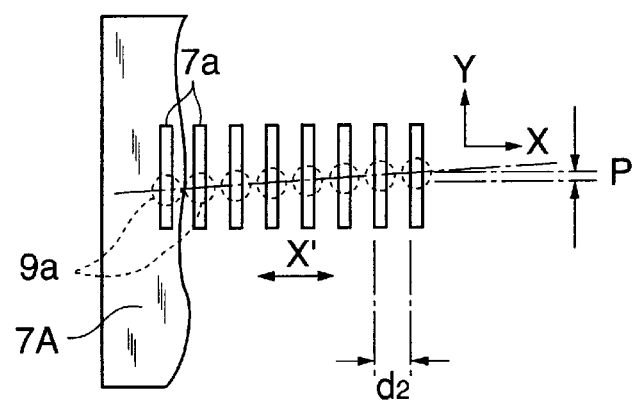
FIG. 15C is a diagram showing a shading film used therein.

FIGS. 15A, 15B and 15C illustrate a principal portion of an optical disk drive according to the fifth embodiment of the present invention. In FIG. 15A, illustration of a head case 25, etc. is omitted. This optical disk drive 100 is the same as that of the first embodiment shown in FIG. 9 except for the following point. A semiconductor laser 2 used in this embodiment is provided with a plurality (say, eight). of laser elements capable of being driven each independently, and plural laser beams 3a are emitted from the plural laser elements. In a shading film 7A are formed plural slits 7a and there is used an eight-divided photodetector 24.

As shown in FIG. 15B, the semiconductor laser 2 is an end-face emitting semiconductor laser and has an active layer 19a, p-type electrodes 19b and an an-type electrode 19c. For example, the spacing, $d_1$, of the p-type electrodes is set to 15 μm, thereby setting the spacing of the laser beams 3a at 15 μm.

As shown in FIG. 15C, the shading film 7A has eight slits 7a correspondingly to the number of the laser beams 3a. Since NA of a collimator lens 4 is 0.16, NA in the transparent light converging medium 6 is 0.8 and the spacing, $d_1$, of the laser beams 3a is 15 μm, the spacing of light spots 9a on a surface 6b for focusing, namely, the spacing, $d_2$, of the slits 7a is set at 3 μm. An array axis direction X' of the slits 7a is slightly inclined relative to the track direction X of an optical disk 12. That is, the slits 7a are arranged so as to be spaced at an interval equal to a track pitch (0.07 μm in this embodiment), p, in a direction perpendicular to the recording track. The angle of inclination in the array axis X' direction of the slits 7a relative to the track direction X is 23 milliradian. For the semiconductor laser 2 this inclination is obtained by adjusting the inclination of a support base of the laser, while for the shading film 7A it is obtained by making adjustment using photolithography at the time of formation of the film.

The following description is now provided about the operation of the optical disk drive 100 of this fifth embodiment. Plural laser beams 3a when emitted from the semiconductor laser 2 are shaped into collimated beams 3b by the collimator lens 4, then pass through a polarization beam splitter 22 and a quarter-wave plate 23, then are folded mirror by a folding mirror 5 and enter a light converging type hologram 10A. When passing through the quarter-wave plate 23, the collimated beams 3b are converted from linearly polarized beams to circularly polarized beams by the quarter-wave plate. The circularly polarized, collimated beams 3b incident on the light converging type hologram 10A become convergent beams and are focused on a surface 18a for focusing of a flying slider 18 to form plural small light spots 9a. Plural proximity field beams 9b leak out to the exterior of the transparent light converging medium 6 through the plural slits 7a present under the plural light spots 9a. The proximity field beams 9b are propagated to a recording layer 121 of the optical disk 12 to effect optical recording or reproduction. Reflected beams from the optical disk 12 travel reverse along the incident beam path and are reflected by the folding mirror 5, then are separated from the incident beams in the polarization beam splitter 22 and are thereafter condensed to the eight-divided photodetector 24 by a condenser lens 26.

According to the optical disk drive 100 of this fifth embodiment, eight recording tracks can be recorded or reproduced each independently and simultaneously by the eight independently modulatable proximity field beams 9b leaking out from the eight slits 7a, whereby the transfer rate in recording and reproduction can be increased to eight times. The array length of the slits 7a is 20 μm or so and the bending of the track in that distance is 0.007 μm, which is about one tenth of the track width. Therefore, the resulting track displacement is negligible. The number of the slits 7a is not limited to eight, but may be increased or decreased according to applications.

As the optical head 1 there may be used any of those shown in FIGS. 3 to 6.

Figure 16A:
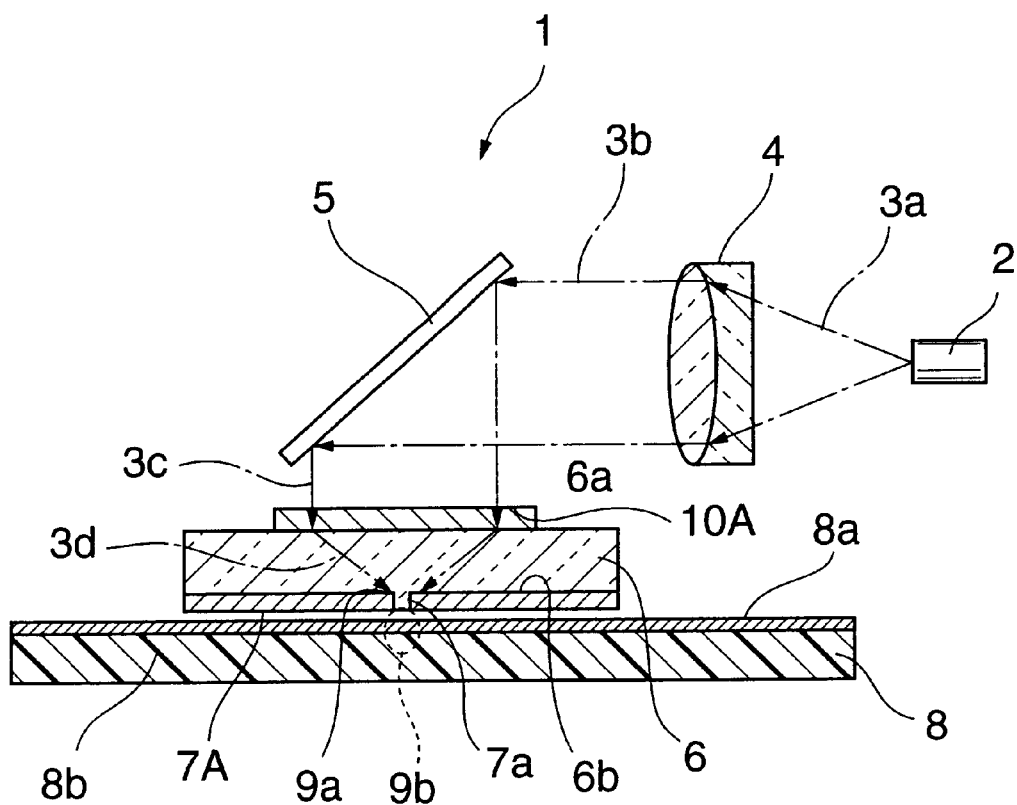
FIG. 16A is a diagram showing a principal portion of an optical head according to the sixth embodiment of the present invention and FIG. 16B is a bottom view thereof.
Figure 16B:
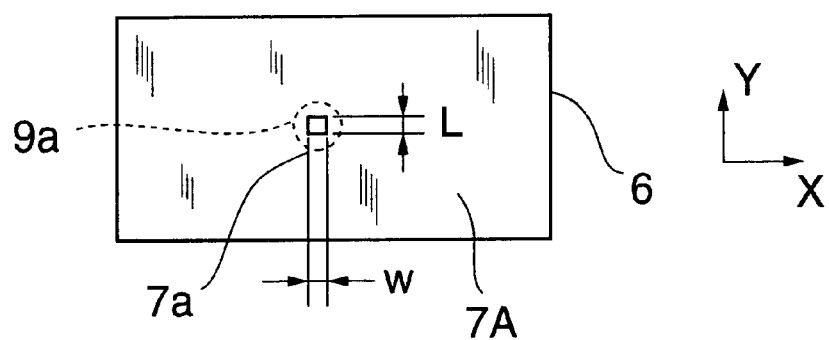

FIGS. 16A and 16B illustrate an optical head according to the sixth embodiment of the present invention. This optical head, indicated at 1, comprises a semiconductor laser 2 which emits a laser beam 3a, a collimator lens 4 which shapes the emitted beam 3a from the semiconductor laser 2 into a collimated beam 3b, a folding mirror 5 which turns down the collimated beam 3b at right angles, and a transparent light converging medium 6 on which the collimated beam 3c is incident from the folding mirror 5.

The transparent light converging medium 6 has an incident surface 6a on which the collimated beam 3c is incident from the folding mirror 5 and on which a light converging type hologram 10A having a light converging function is formed and a surface 6b for focusing on which a convergent beam 3d from the incident surface 6a is focused. On the surface 6b for focusing of the transparent light converging medium 6 is formed a shading film 7A having a fine aperture 7a' which is smaller in diameter than a light spot 9a formed on the surface 6b for focusing. The fine aperture 7a' is formed in a square shape one side of which is perpendicular to the track direction X of an optical disk 8. Since the recording density depends on the size of a near-field light in the track direction X, the recording density in the track direction X is equal to that obtained in the use of a circular fine aperture. On the other hand, the intensity of the near-field light can be made higher than in the use of a circular hole. However, a circular fine aperture is superior in point of easiness of machining, so there may be used a circular fine aperture.

Although the light converging type hologram 10A is formed by a binary hologram comprising concentric uneven surfaces, there may be used a volume hologram formed of a polymer material.

As the semiconductor laser 2 there was used a distributed feed back laser with reduced wavelength variation or a distributed Bragg reflector type laser. This is because the chromatic aberration of hologram, i.e., variation of diffraction angle caused by wavelength, is marked and therefore the use of a laser having high wavelength dependence such as an end-face emitting laser results in deviation of the focusing position, necessity of an auto-focusing control mechanism for correcting the positional deviation and increase in size of the optical head 1. In the case of a vertical cavity surface emitting laser (VCSEL), the wavelength dependence can be diminished by shifting the center of the gain curve from the generated wavelength and thus the surface emitting laser is employable if there is made such a consideration.

To be more specific, the thickness of the transparent light converging medium 6 is 0.4 mm, the diameter of the collimated beam 3c is about 6 mm, and the height of the head 1 is about 1 mm. Further, the angle of convergence of the convergent beam 3d is about 60° and NA thereof is 0.87. In this case, the diameter $D_{1/2}$ of the light spot 9a on the surface 6b for focusing is given by the following expression:

$$D_{1/2}=k\cdot\lambda/(n\cdot NA)$$

where k is a constant which depends on the intensity distribution of incident beam which is about 0.5 in the case of a Gaussian beam, λ stands for the wavelength of the light source, and n stands for a refractive index of the transparent light converging medium 6. When a GaInAlP-based red laser (wavelength: 0.63 μm) is used as the light source and a heavy flint glass (n=1.83) is used as the transparent light converging medium 6, a value of about 0.2 μm is obtained as the diameter $D_{1/2}$ of the light spot 9a.

The shading film 7A, which is formed of titanium (Ti), has a thickness (say 10 nm) smaller than the wavelength of laser beam, with a fine aperture 7a' formed in a position corresponding to the light spot 9a, and functions to shade light so that light may not emerge directly to the exterior from the light spot 9a and allow a near-field light 9b to be formed through the fine aperture 7a'. Given that the length in the track direction X of the fine aperture 7a' is W, the length thereof in a direction perpendicular to the track direction X is L and the diameter of the light spot 9a is $D_{1/2}$, there is established the following relationship of W, L and $D_{1/2}$:

$$W<D_{1/2} \text{ and } L<D_{1/2}$$

As a result, there is formed a near-field light 9b of W×L long. In this embodiment, the lengths W and L are each set at one per several or less in comparison with the light spot diameter $D_{1/2}$, i.e., about one tenth (say 50 nm) of the laser beam wavelength. With development of the high recording density attaining technique for optical disks and the fine aperture forming technique, the lengths w and L may each be set smaller than 50 nm. The shading film 7A may have been subjected, around the fine aperture 7a', to a treatment (for example a blackening treatment) for absorbing the laser beam. Alternatively, it may be formed using a laser beam absorbing material. As a result, a lowering of the S/N ratio caused by the laser beam reflected around the fine aperture 7a' of the shading film 7A can be prevented.

Since the lengths W and L of the fine aperture 7a' are each as small as one tenth or so of the laser beam wavelength, almost no propagation light will emerge from the fine aperture. A near-field light 9b having a length almost equal to the length W of the fine aperture 7a' in the track direction X, also having a length almost equal to the length L of the fine aperture 7a' in the direction Y perpendicular to the direction X and further having a length several times larger in the vertical direction, leaks out to a proximate distance almost equal to the laser beam wavelength. If a medium having a refractive index almost equal to that of the transparent light converging medium 6, such as the optical disk 8, is disposed in proximity to the near-field light 9b, the near-field light 9b will enter the recording layer 8a of the optical disk 8 as a propagation light, which light permits recording and reading to and from the recording layer 8a. The quantity of this propagation light is represented by the following expression:

$$I=I_0 \times \iota^a \iota^a e^{-(x^2+y^2)/w^2} dx \cdot dy \qquad \text{[Expression 1]}$$

where,

Io: the total power of laser

ω: radius of the light spot 9a on the surface 6b for focusing a: half width of the fine aperture 7a'

That is, in the case of a red laser, the quantity of laser beam passing through the fine aperture 7a' is about 15% of the total power of the light spot 9a, 20% in the case of blue color, and thus the light converging effect can be improved 100 times or more in comparison with the use of the conventional optical fiber.

Figure 17A:
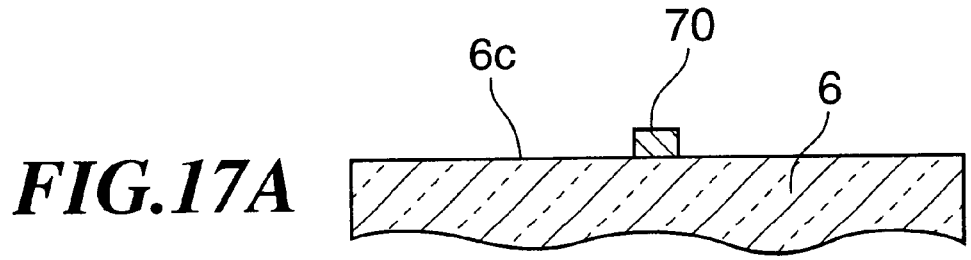
FIGS. 17A to 17D are diagrams showing an example of how to form a light shading/reflecting film according to the first embodiment of the present invention.
Figure 17B:
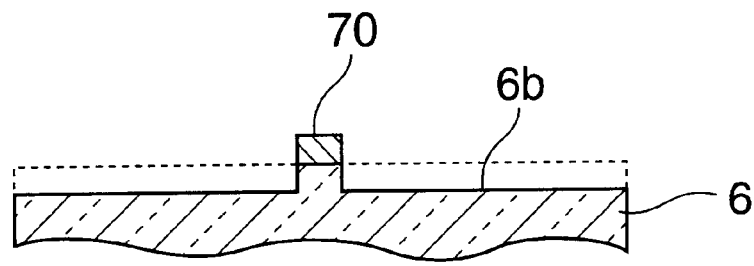
Figure 17C:
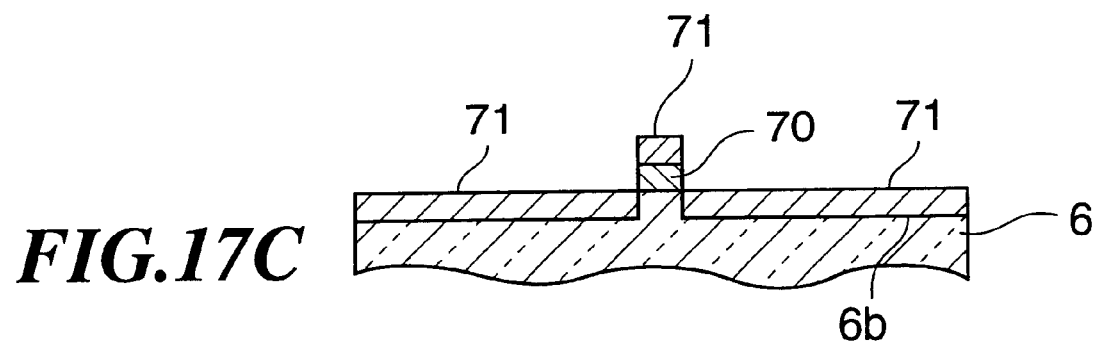
Figure 17D:
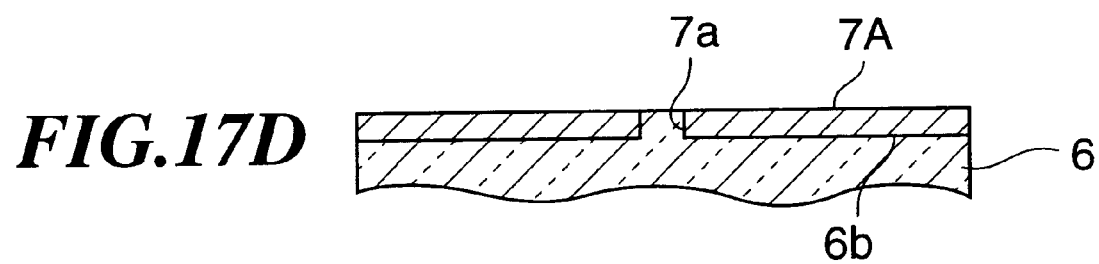

FIGS. 17A to 17D illustrate how to form the shading film 7A and the fine aperture 7a'. First, a photoresist film 70 for electron beam exposure is applied to a bottom 6c of the transparent light converging medium 6 and exposure is made with electron beam so that there remains a portion corresponding to the fine aperture 7a' (FIG. 17A). After subsequent development, the bottom 6c is subjected to dry etching anisotropically to about 100 Å to form a surface 6b for focusing (FIG. 17B). As an etching gas there is used a $CF_4$-based gas. Next, a Ti film 71 for shading light is formed to about 100 Å by sputtering (FIG. 17C) and the photoresist film 70 is melted to lift off the Ti film 71 which corresponds to the fine aperture 7a' (FIG. 17D). In this way the shading film 7A having the fine aperture 7a' is formed. As the shading film 7A there may be used any other film than a Ti film insofar as the film used has a light shading property and an excellent adherability to glass.

The operation of the optical head 1 will now be described. The laser beam 3a when emitted from the semiconductor laser 2 is shaped into a collimated beam 3b by the collimator lens 4, then is folded mirror at right angles by the folding mirror 5 and enters the light converging type hologram 10A. The collimated beam 3c incident on the hologram 10A becomes a convergent beam 3d and forms a light spot 9a on the surface 6b for focusing of the transparent light converging medium 6. The laser beam 3d thus converged to the light spot 9a on the focusing surface 6b passes through the fine aperture 7a' on the shading film 7A and leak out as the near-field light 9b to the exterior of the transparent light converging medium 6. The recording layer 8a on the plastic substrate 8b of the optical disk 8 is irradiated with the near-field light 9b to effect information recording and reproduction. The focusing surface 6b is also used as a slider surface for flying travel on the optical disk 8. The flying height is in the range from several ten to 200 nm though it differs depending on the wavelength of light and the diameter light spot.

The above construction can afford the following effects:

(a) Since the laser beam is converged by using the hologram 10A, it is possible to effect direct focusing from the collimated beam 3c without using an objective lens, thus permitting the height of the optical head to be reduced.

(b) The use of the hologram 10A for the convergence of laser beam permits the attainment of a high NA value and hence permits the formation of a small light spot of 0.2 μm even in the use of a light source of red color.

(c) With use of a laser less dependent on wavelength as the light source, it is possible to eliminate the problem of chromatic aberration even in the use of the hologram for light convergence, so that it becomes unnecessary to use an auto-focusing control mechanism and therefore an optical head smaller in size can be formed. As a result, when several optical disks are used in a stacked state, it is possible to narrow the disk spacing, that is, a larger number of disks can be stacked and it is possible to attain a larger capacity. In addition, since the whole of the optical disk drive can be made thin, it is possible to attain the reduction of size in the case of using it as a memory for a portable terminal. This is advantageous.

(d) Since the near-field light 9b leaking out from the microminiaturized light spot 9a is throttled by the fine aperture 7a' formed in the shading film 7A, the size of the near-field light 9b can be reduced to one per several as compared with that in the conventional light convergence using Super SIL, thus permitting the recording density to be increased to several times.

(e) By using the focusing surface 6b also as a slider surface for flying travel, not only can the structure of the optical head be simplified but also it becomes possible to attain a further reduction of size and cost.

The slit 7a shown in FIGS. 3A and 3B may be substituted by the fine aperture 7a' used in this embodiment.

Figure 18A:
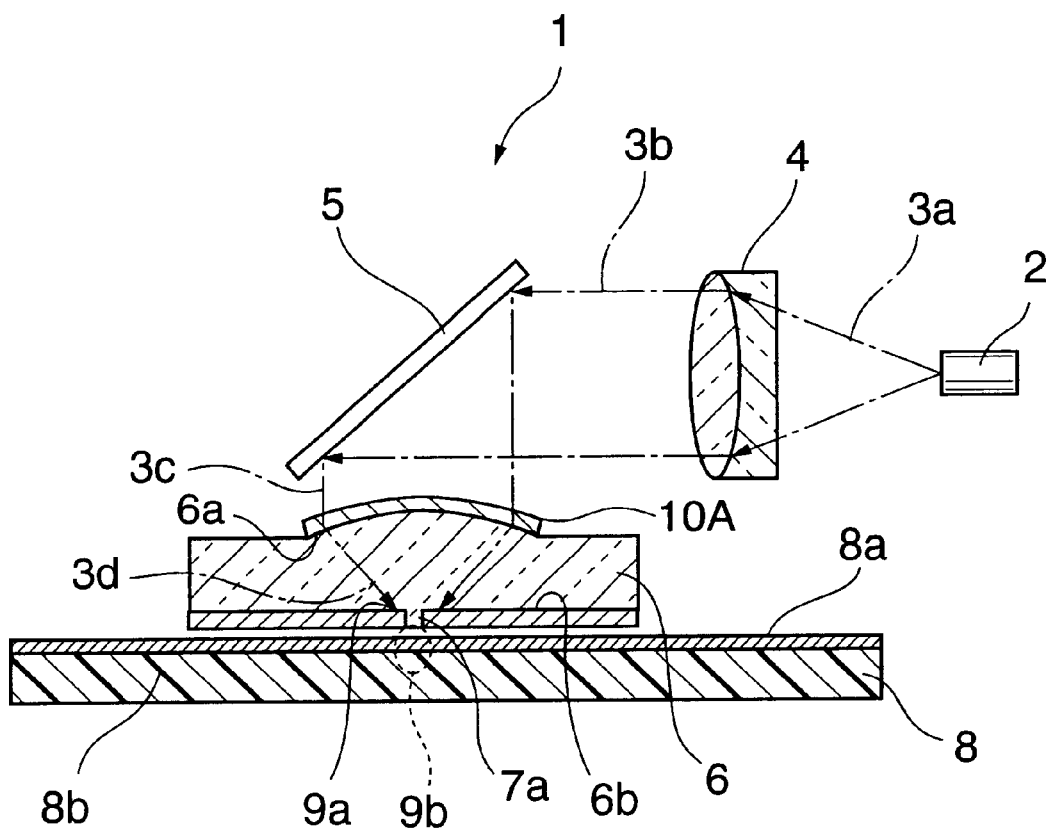
FIG. 18A is a diagram showing a principal portion of an optical head according to the seventh embodiment of the present invention and FIG. 18B is a bottom view thereof.
Figure 18B:
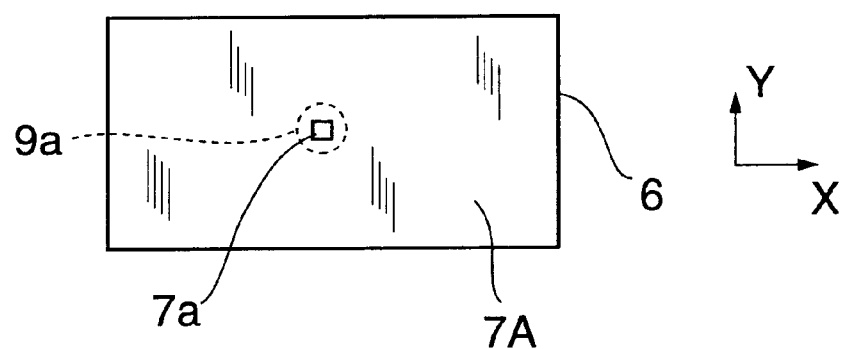

FIGS. 18A and 18B illustrate an optical head according to the seventh embodiment of the present invention. This optical head, indicated at 1, is of the same construction as that of the previous sixth embodiment except that there is used a convex incident surface 6a. Such a convex shape of the incident surface 6a is advantageous in that the convergence of laser beam is carried out by both the convex incident surface 6a and the light converging type hologram 10A, that wavelength variations of the two can be offset because the chromatic aberrations of the two are reverse to each other with respect to wavelength, and that even such a laser of a large wavelength variation as an end-face emitting laser is employable without the need of making auto-focusing control.

Figure 19A:
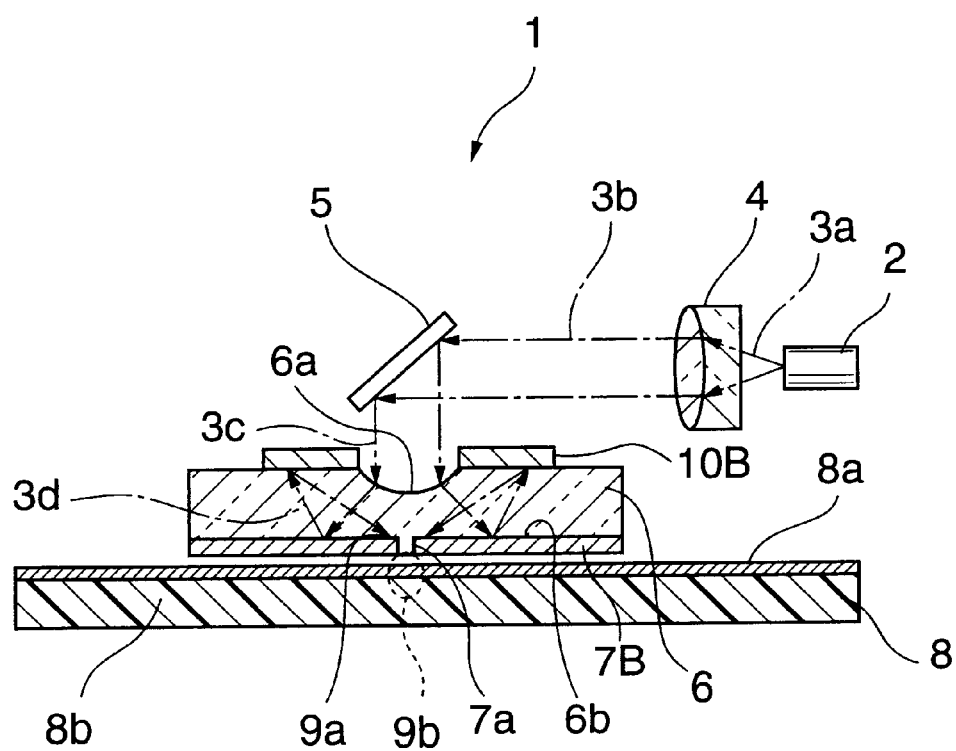
FIG. 19A is a diagram showing a principal portion of an optical head according to the eighth embodiment of the present invention and FIG. 19B is a bottom view thereof.
Figure 19B:
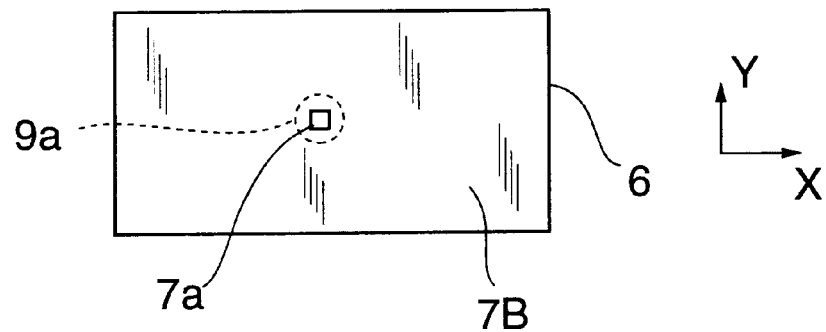

FIGS. 19A and 19B illustrate an optical head according to the eighth embodiment of the present invention. This optical head, indicated at 1, is different in the following point from that used in the sixth embodiment. The light introducing function and the light converging function of the incident surface 6a are separated from each other and the incident surface 6a is formed in a concave spherical surface. Incident beam 3d which has been refracted and expanded by the concave spherical incident surface 6a is reflected by a light shading reflective film 7B and is further reflected and converged by a reflective surface 6d formed with a reflective hologram 10B to form a light spot 9a on a surface 6b for focusing. In this case, if the numerical aperture, NA, of the reflective hologram 10B is set equal to that at the incident surface 6a in the first embodiment, the diameter of a collimated beam 3c can be reduced to a half or less, so that the other optical components, including a folding mirror 5, can be reduced in size and hence it is possible to reduce the size of the optical head.

Figure 20A:
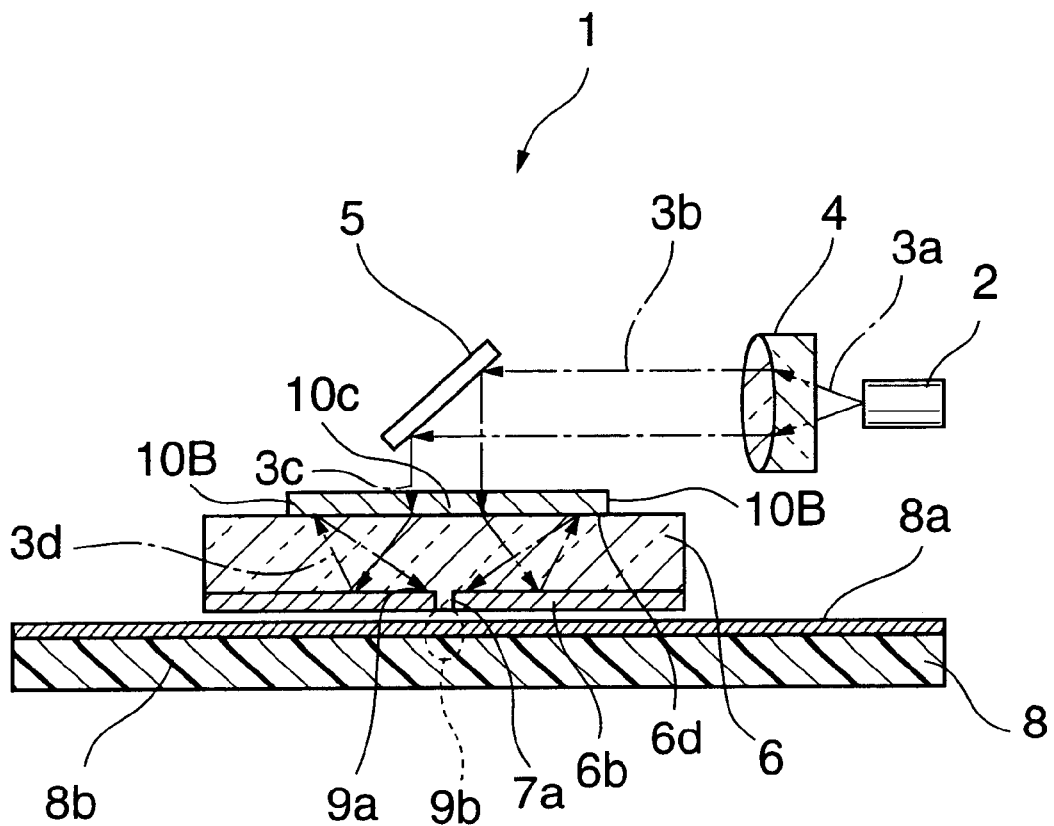
FIG. 20A is a diagram showing a principal portion of an optical head according to the ninth embodiment of the present invention and FIG. 20B is a bottom view thereof.
Figure 20B:
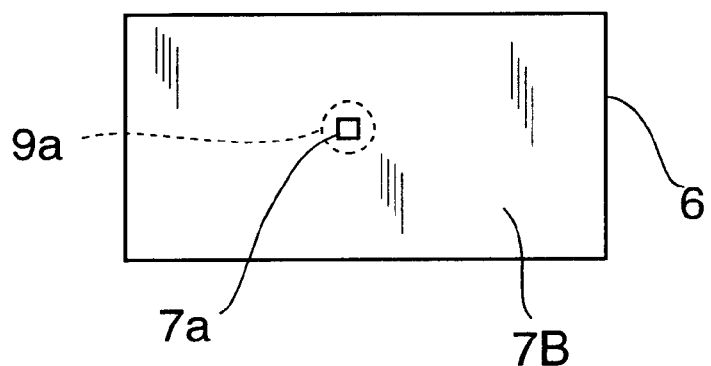

FIGS. 20A and 20B illustrate an optical head according to the ninth embodiment of the present invention. This optical head, indicated at 1, is of the same construction as that used in the previous eighth embodiment except that the function of the concave spherical incident surface 6a is substituted by a planar diffusion type hologram 10C. By such replacement of the concave spherical incident surface 6a with the diffusion type hologram 10C it becomes possible to offset chromatic aberrations of the diffusion type hologram 10C and the reflection type hologram 10B, thus affording a light converging optical head of a small wavelength dependence, and even if there is used a laser of a large wavelength variation such as an end-face emitting laser, it is possible to converge light without the need of making an auto-focusing control.

Although in the above embodiment the transparent light converging medium 6 is formed flat on its side opposed to the optical disk 8, it may be formed so as to have a difference in height for example insofar as the laser beam is focused to form a light spot on at least one side of the transparent light converging medium 6.

As a drive mechanism in the optical disk drive relating to the above embodiment, the one shown in FIG. 7 may be used.

Also in this embodiment there may be used the optical disk 12 shown in FIG. 8. In this embodiment, information is recorded in the land portions 12b, the track pitch is set at 0.25 μm and the depth of each groove portion 12a is set at about 0.1 μm. The mark length is 0.13 μm and the recording density is 19 Gbits/inch$^2$, which corresponds to a recording capacity of 27 GB in a 12 cm disk. Thus, it was possible to attain a high recording density 7.6 times as high as that in the prior art.

Figure 21A:
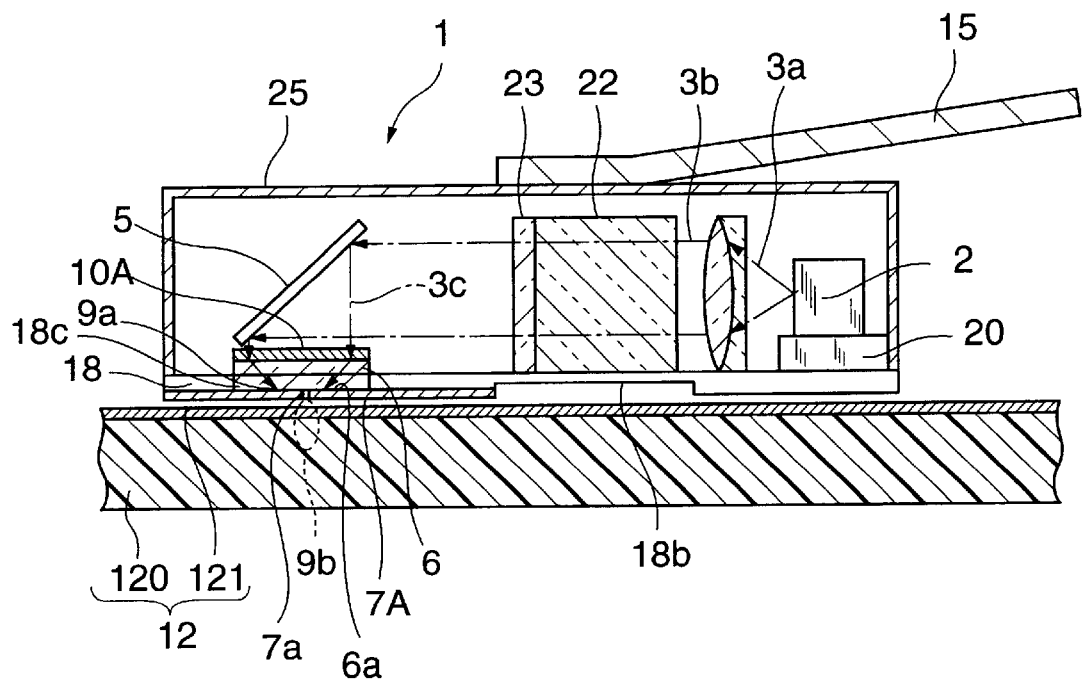
FIG. 21A is a longitudinal sectional view of an optical head according to the sixth embodiment of the present invention and FIG. 21B is a transverse sectional view thereof.
Figure 21B:
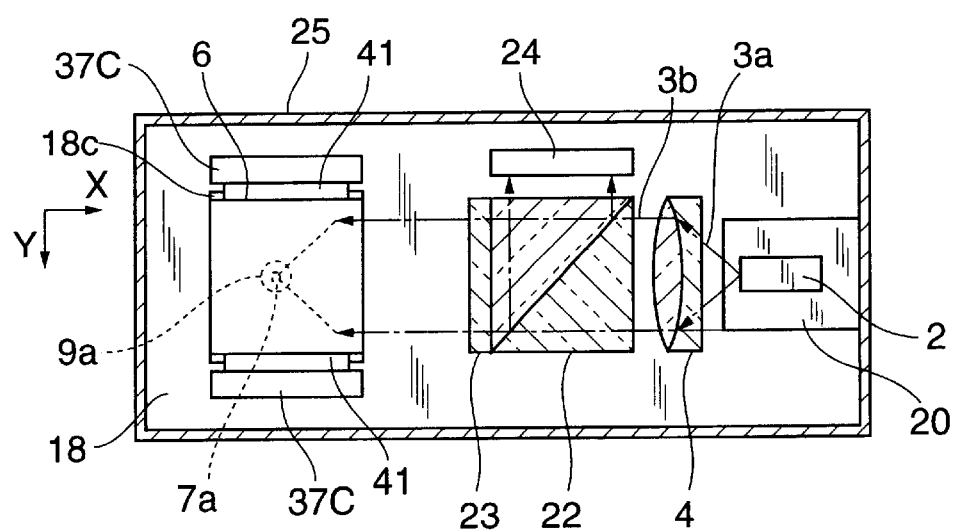

FIG. 21 illustrates an optical head 1 used in this optical disk drive 100, in which FIG. 21A is a side view of the optical head and FIG. 21B is a plan view thereof. The optical head 1 has a flying slider 18 which fliess on an optical disk 12. On the flying slider 18 are disposed an end-face emitting semiconductor laser 2 which is formed of AgGaInP for example and which emits a laser beam 3a having a wavelength of 630 nm, a collimator lens 4 which shapes the laser beam 3a into a collimated beam 3b, a holder 20 formed by a fused quartz plate and which is for holding the semiconductor laser 2 on the flying slider 18, a polarization beam splitter 22 which separates the collimated beam 3b provided from the semiconductor laser 2 and reflected beam reflected by the optical disk 12 from each other, a quarter-wave plate 23 which makes the collimated beam 3b provided as a linearly polarized beam from the semiconductor laser 2 into a circularly polarized beam, a folding mirror 5 which turns down the collimated beam 3b provided from the quarter-wave plate 23 at right angles toward the optical disk 12, a transparent light converging medium 6 with a light converging type hologram 10A formed on an incident surface 6a, holders 37C which hold the transparent light converging medium 6 through piezoelectric elements 41 adapted to cause the medium 6 to shift in the direction Y perpendicular to the track direction X, and a photodetector 24 mounted on the flying slider 18 and which receives reflected beam from the optical disk 12 through the beam splitter 22. All of these components are accommodated within a head case 25, which case is fixed to a front end of a suspension 15.

For example, the transparent light converging medium 6 is formed by a heavy flint glass having a refractive index, n, of 1.91 and has a height of 1 mm and a length of 2 mm. The transparent light converging medium 6 is constituted in the same manner as the transparent light converging medium 6 shown in FIG. 16 and is accommodated within an opening 18c formed in the flying slider 18 so as to be movably in the direction Y perpendicular to the track direction X.

As shown in FIG. 21A, the flying slider 18 is formed with a groove 18b so as to generate a negative pressure. Under the action of both the positive and negative pressure induced by the slide 18b and the resilience of the suspension 15 the spacing between the flying slider 18 and the optical disk 12 is maintained constant as a flying quantity. In this embodiment the flying height is about 0.06 $\mu$m.

In recording, an optical head drive system 16 modulates the output beam of the semiconductor laser 2 in accordance with a recording signal, thereby induces a phase change between crystal and amorphous phases in a recording layer 121 and records it as a difference in reflectance in that period, while in reproduction the output beam of the semiconductor laser 2 is not modulated, but is emitted continuously, and the above difference in reflectance in the recording layer 121 is detected as a variation of reflected beam by the photodetector 24.

A signal processing system 17 produces an error signal for tracking control and a data signal on the basis of the reflected beam from the optical disk 12 which has been detected by the photodetector 24, allowing the error signal to pass through a high pass filter and a low pass filter into an error signal of a high frequency and an error signal of a low frequency, and on the basis of these error signals, makes a tracking control for the optical head drive system 16. The error signals for tracking control are here produced by a sample servo method (Optical Disk Technology, Radio Technology Co., p. 95). According to this sample servo method, zigzag marks (Wobbled marks) are provided intermittently on the track and error signals are produced on the basis of variations in reflection intensity provided from those marks. In this method, recording signals and tracking error signals are separated time-divisionally from each other and the separation of the two is performed by a gate circuit included in a reproduction circuit. Error signals may be produced by a push-pull method which utilizes interference with reflected beam from groove portions 12a.

The operation of the optical disk drive 100 being considered will now be described. The optical disk 12 rotates at a predetermined speed by means of a motor (not shown) and the flying slider 18 seeks while flying on the optical disk 12 under the action of both a positive and negative pressure developed by the rotation of the optical disk 12 and the resilience of the suspension 15. When the laser beam 3a is emitted from the semiconductor laser 2 by operation of the optical head drive system 16, the emitted beam 3a from the semiconductor laser 2 is shaped into the collimated beam 3b by the collimator lens 4. The collimated beam 3b passes through the polarization beam splitter 22 and the quarter-wave plate 23, then is folded mirror at right angles by the folding mirror 5 and enters the light converging type hologram 10A. When passing through the quarter-wave plate 23, the collimated beam 3b is converted from a linearly polarized beam to a circularly polarized beam by the quarter-wave plate. The circularly polarized, collimated beam 3b incident on the light converging type hologram 10A becomes a convergent beam and is focused on a surface 6b of the transparent light converging medium 6 for focusing to form a very small light spot 9a. A portion of the light spot 9a leaks out as a near-field light 9b to the exterior of the underside of the flying slider 18 through a fine aperture 7a' formed under the light spot 9a and is propagated to the recording layer 121 of the optical disk 12 to effect optical recording or reproduction. Reflected light from the optical disk 12 travels reverse along the incident beam path, then is reflected in a 90° direction by the polarization beam splitter 22 and enters the photodetector 24. On the basis of the reflected light from the optical disk 12 which light has entered the photodetector 24 the signal processing system 17 produces an error signal for tracking control and a data signal and makes a tracking control for the optical head drive system 16 on the basis of the error signal.

According to the optical disk drive 100 being considered, the NA value of the beam converged by the transparent light converging medium 6 becomes 0.86, bringing a result that there is obtained a very small light spot having a diameter $D_{1/2}$ of about 0.2 $\mu$m, about 20% of which is passed through the fine aperture 7a' of 50 nm in width to form the near-field light 9b. Thus, the near-field light 9b can be applied to the recording layer 121 of the optical disk 12, whereby it is possible to effect optical recording and reproduction at an ultra-high density (180 Gbits/inch$^2$)

In addition, since recording and reproduction can be done without making auto-focusing control, it becomes unnecessary to use an auto-focusing control mechanism and therefore it is possible to greatly reduce the weight and size of the optical head 1. More particularly, the size of the optical head 1 was reduced to 2 mm high by 3 mm wide by 6 mm long and the weight thereof was reduced to 0.2 g. Consequently, the weight of moving components, including a moving coil 14B of a linear motor 14 and the suspension 15, could be reduced to 2.0 g or less. As a result, with the linear motor 14 alone, there could be obtained a frequency band of 50 kHz or more and a gain of 60 or more. Thus, tracking is feasible at 600 rpm and there could be obtained an average transfer rate of 60 Mbps.

Moreover, since recording signals and tracking error signals are separated time-divisionally from each other by the adoption of the sample servo method, it is not necessary that the photodetector 24 be a divided type. For example, there may be used a PIN photodiode of 1 mm square. Since it is not necessary for the photodetector 24 to be a divided type, the detection system can be greatly simplified and reduced in weight.

Further, since the weight of the transparent light converging medium 6 is as light as 5 mg or less, the resonance frequency of the system which supports the transparent light converging system 6 can be set at 300 kHz or more and there could be obtained a displacement of 0.5 $\mu$m or more at a voltage of 5V applied between electrode terminals 410.

Further, with the two-stage control using both piezoelectric elements 41 and linear motor 14, there were obtained a frequency band of 300 kHz and a gain of 80 dB and tracking could be done with an accuracy of 5 nm under a high-speed revolution (3,600 rpm). In this embodiment the transfer rate could be increased to six times as high as that obtained in an optical disk drive 100 not using the piezoelectric elements 41, i.e., to 360 Mbps.

In the case of using a multi-beam optical head which will be described later, the transfer rate further increases to eight times and there actually was obtained a transfer rate of nearly 500 Mbps. In the use of a 12 cm disk there was attained an average seek speed of 10 ms or less. As a result, the access time at 3,600 rpm becomes 20 ms or less.

The production of an error signal for tracking control can be done in the same manner as in the first embodiment.

As the disk unit there may be used a construction which uses the rotary linear motor 43 used in the hard disk shown in FIG. 11 or such a construction as shown in FIG. 12 wherein the optical head 1 and the fixed unit 200 are optically connected together through the optical fiber 201.

The optical disk drive may be constituted as in FIG. 13. When in the structure of the optical head 1 used therein there are used such a transparent light converging medium 6 and an AlGaInN-based laser (630 nm) as are basically identical with those shown in FIG. 21, the diameter of light spot formed is 0.2 $\mu$m. The disk diameter is 12 cm, the tack pitch and the mark length are 0.07 $\mu$m and 0.05 $\mu$m, respectively, the capacity is 300 GB on one side and is 3 TB in total.

Figure 22A:
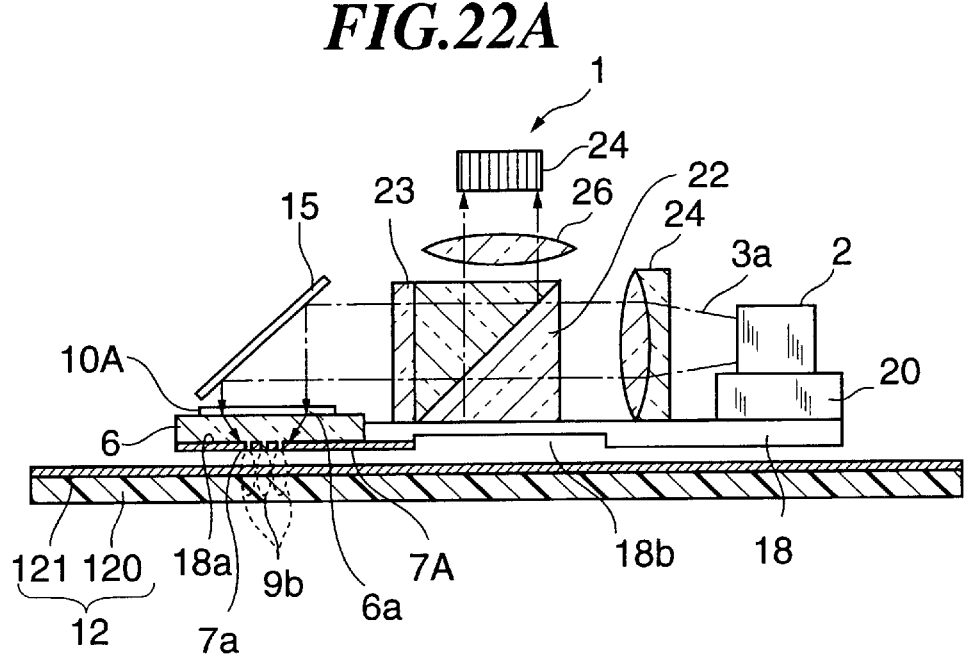
FIG. 22A is a diagram showing a principal portion of an optical disk drive according to the tenth embodiment of the present invention.
Figure 22B:
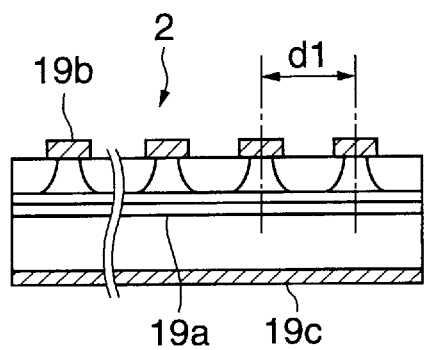
FIG. 22B is a diagram showing a semiconductor laser used therein.
Figure 22C:
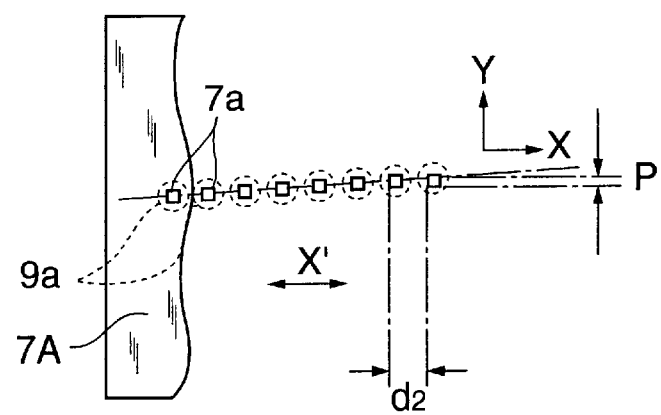
FIG. 22C is a diagram showing a shading film used therein.
Figure 23A:
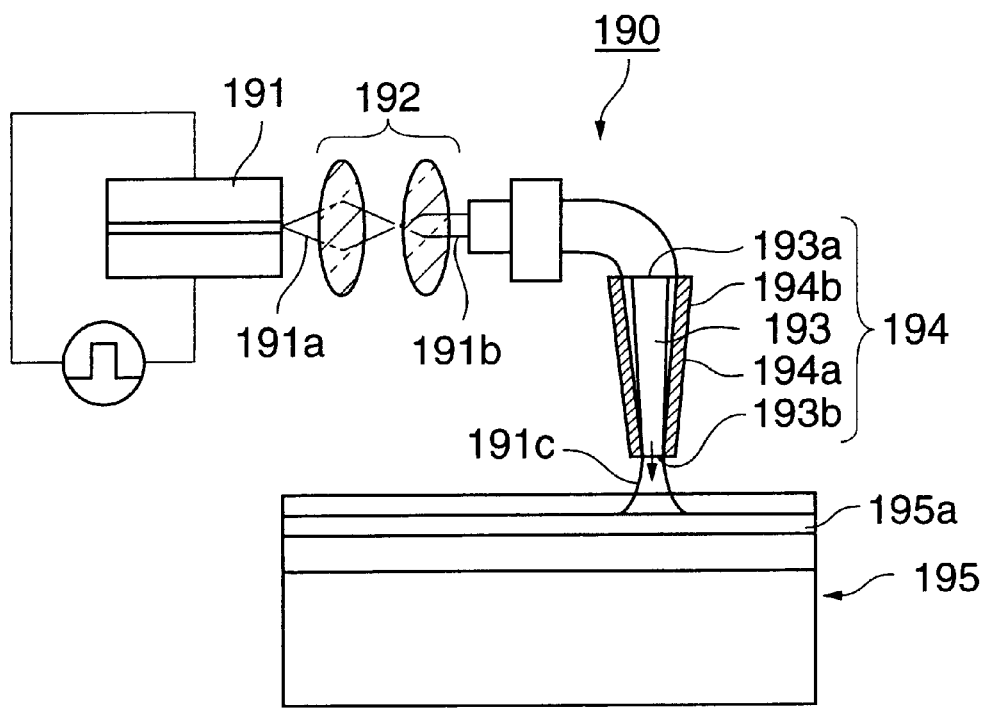
FIG. 23 is a diagram showing a conventional optical disk drive and FIG. 23B is a diagram showing the operation thereof in reproduction.
Figure 23B:
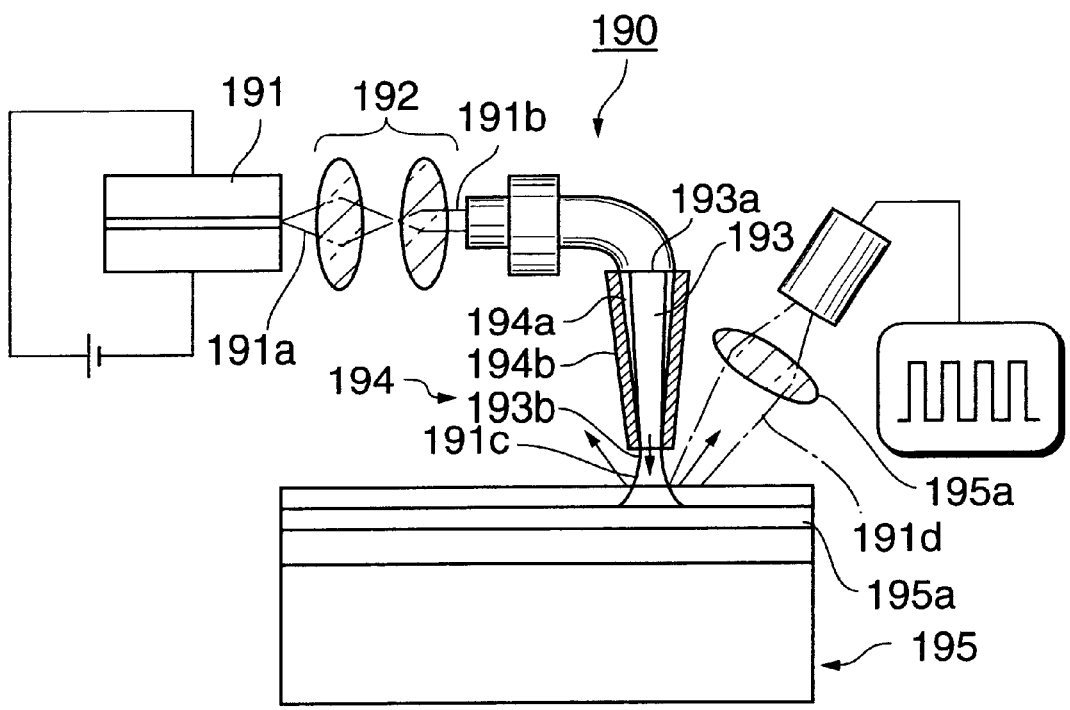
Figure 24:
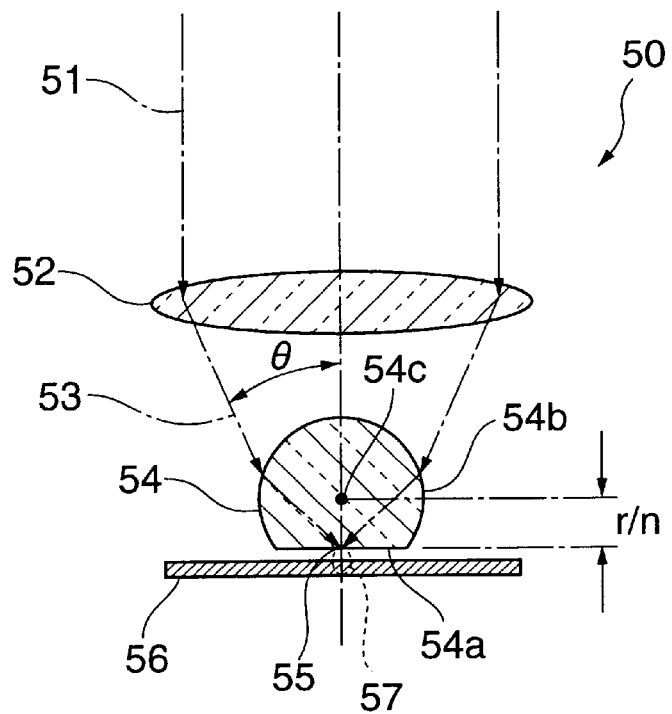
FIG. 24 is a diagram showing another conventional optical disk drive.
Figure 25:
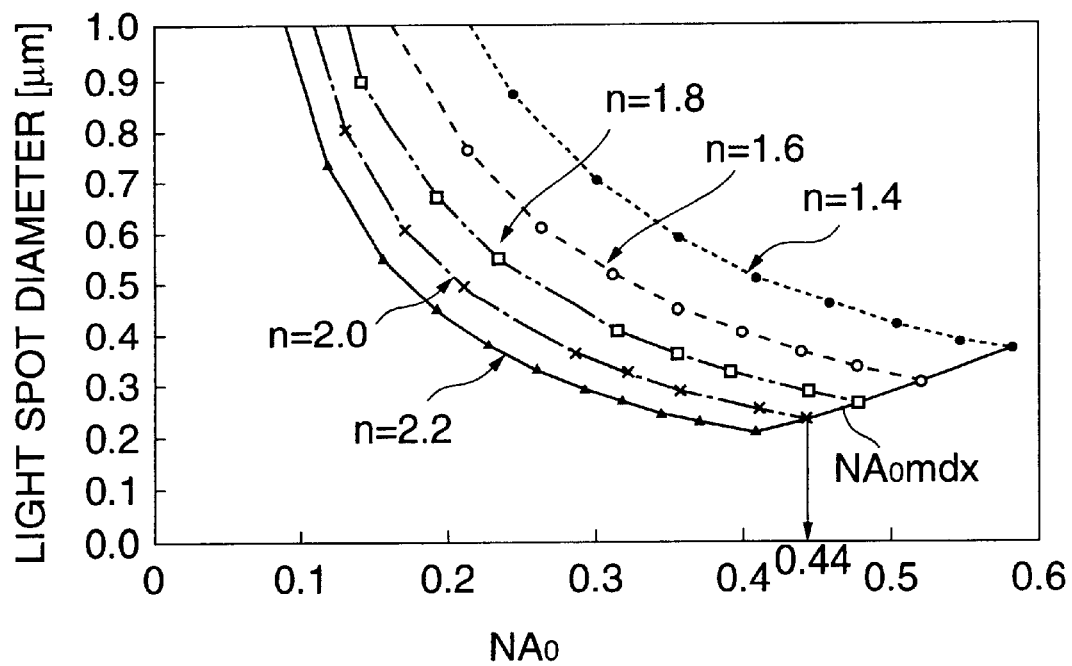
FIG. 25 is a diagram showing a relation between a refractive index, n, and NA in FIG. 17.

FIGS. 22A, 22B and 22C illustrate a principal portion of an optical disk drive according to the tenth embodiment of the present invention. In FIG. 22A, a head case 25, etc. are not shown. This optical disk drive, indicated at 100, is the same as the optical disk drive of the first embodiment except that the semiconductor laser 2 used in this tenth embodiment is provided with a plurality (say eight) of laser elements capable of being driven each independently, with plural laser beams 3a being emitted from the plural laser elements, that plural fine apertures 7a' are formed in the shading film 7A and that there is used an eight.-divided photodetector 24.

As shown in FIG. 22B, the semiconductor laser 2 is an end-face emitting semiconductor laser and has an active layer 19a, p-type electrodes 19b and an n-type electrode 19c. The spacing $d_1$ of the p-type electrodes 19b is set at say 15 $\mu$m, whereby the spacing of the laser beams 3a is set at 15 $\mu$m.

As shown in FIG. 22C, the shading film 7A has eight fine apertures 7a' correspondingly to the number of laser beams 3a. NA of the collimator lens 4 is 0.16, NA in the transparent light converging medium 6 is 0.8 and the spacing $d_1$ of laser beams 3a is 15 $\mu$m, so the spacing of light spots 9a on the focusing surface 6b, namely, the spacing $d_2$ of fine apertures 7a', is set at 3 $\mu$m. An array axis direction of the fine apertures 7a' is slightly inclined relative to the track direction X of the optical disk 12 so that the fine apertures 7a' are positioned just above adjacent tracks respectively. That is, the fine apertures 7a' are arranged so that the spacing of adjacent fine apertures 7a' in a direction perpendicular to the recording track is equal to the track pitch (0.07 $\mu$m). The angle of inclination of the fine aperture array axis direction X' relative to the track direction X is 23 milliradian. This inclination is obtained by adjusting the inclination of a support base for the semiconductor laser 2 or by making adjustment using photolithography at the time of forming the shading film 7A.

The operation of the optical disk drive 100 according to this embodiment will now be described. Plural laser beams 3a when emitted from the semiconductor laser 2 are shaped into collimated beams 3b by the collimator lens 4, then the collimated beams 3b pass through the polarization beam splitter 22 and the quarter-wave plate 23, then are folded mirror at right angles by the folding mirror 5 and enter the light converging type hologram 10A. When passing through the quarter-wave plate 23, the collimated beams 3b are changed from linearly polarized beams into circularly polarized beams by the quarter-wave plate 23. The circularly polarized, collimated beams 3b thus incident on the light converging type hologram 10A become convergent beams and are focused on the focusing surface 18a of the flying slider 18 to form plural very small light spots 9a. Plural proximity field beams 9b leak out to the exterior of the transparent light converging medium 6 through the plural fine apertures 7a' located below the plural light spots 9a and are propagated to the recording layer 121 of the optical disk 12 to effect optical recording or reproduction. Reflected beams from the optical disk 2 travel reverse along the incident beam paths, then are reflected by the folding mirror 5 and are separated from the incident beams by the polarization beam splitter 22, then are condensed onto the eight-divided photodetector 24 by the condenser lens 26.

According to the optical disk drive 100 of this embodiment, eight recording tracks can be subjected to recording or reproduction independently and simultaneously with eight independently modulatable proximity field beams 9b leaking out from the eight fine apertures 7a' and thus the transfer rate in recording and reproduction can be increased eight times. The array of the fine apertures 7a' is about 20 $\mu$m long and the bending of track at this distance is 0.007 $\mu$m, which is about one tenth of the track width. This track deviation is negligible. The number of the fine apertures 7a' is not limited to eight, and may be increased or decreased according to the purpose of use.

As the optical head 1 there may be used any of the optical heads shown in the other embodiments such as that shown in FIG. 19 or FIG. 20.

According to the present invention, as set forth above, since laser beam is converged using a hologram, it is not necessary to use an objective lens and therefore it is possible to attain the reduction of size in the vertical direction.

In addition, the use of a hologram for the convergence of laser beam permits the attainment of a high NA value and thereby permits the formation of a very small light spot on the surface of the transparent light converging medium. Further, since the light spot is shaded by a shading film having an aperture whose width is smaller than the diameter of the light spot, there is obtained a near-field light spot which is smaller than the light spot formed on the surface of the transparent light converging medium, thus making it possible to attain a high recording density.

What is claimed is:

1. An optical head which converges a laser beam into a light spot, comprising:

a laser beam emitting unit that emits the laser beam;

a transparent light converging medium having a first surface onto which is adhered a hologram having a function of converging the laser beam and on which the laser beam emitted from the laser beam emitting unit is incident through the hologram and a second surface on which the laser beam incident on the first surface is focused to form the light spot; and a shading film formed on the second surface of the transparent light converging medium and having an aperture in a position where the shading film shades the light spot, the aperture having a width smaller than the diameter of the light spot.

2. The optical head according to claim 1, wherein the aperture is in the shape of a slit having one width smaller than the diameter of the light spot and the other width larger than the light spot diameter.

3. The optical head according to claim 1, wherein the aperture is a fine aperture having a size that enables the whole of the aperture to be positioned inside of the light spot.

4. The optical head according to claim 3, wherein the aperture is rectangular.

5. The optical head according to claim 1, wherein the first surface is formed in a convex shape.

6. The optical head according to claim 1, wherein the transparent light converging medium has a projection of which a part is located within the aperture.

7. The optical head according to claim 1, wherein the transparent light converging medium has a refractive index of larger than 1.

8. The optical head according to claim 1, wherein the hologram is a convex/concave type binary hologram.

9. The optical head according to claim 1, wherein the hologram is a volume hologram.

10. The optical head according to claim 1, wherein the laser beam emitting unit is a distributed feed back type laser.

11. The optical head according to claim 1, wherein the laser beam emitting unit is a surface emitting laser.

12. The optical head according to claim 1, wherein the second surface is substantially a flat surface.

13. The optical head according to claim 1, wherein the transparent light converging medium is a flying slider adapted to fly and seek while allowing a clearance to be formed between the second surface and an optical disk with rotation of the optical disk.

14. The optical head according to claim 1, wherein
the transparent light converging medium comprises a first transparent medium and a second transparent medium both in close contact with each other and having the same refractive index,
the first transparent medium having the first surface, and
the second transparent medium having the second surface and being a flying slider adapted to fly and seek while allowing a clearance to be formed between the second surface and the optical disk with rotation of the optical disk.

15. An optical head which converges a laser beam into a light spot, comprising:
a laser beam emitting unit that emits the laser beam;
a transparent light converging medium having a first surface on which the laser beam emitted from the laser beam emitting unit is incident and which has a function of diffusing the incident laser beam, a second surface which reflects the laser beam incident on the first surface, and a third surface onto which is adhered a hologram having a function of reflecting and converging the laser beam and which causes the laser beam reflected by the second surface to be reflected and converged into a light spot on a different surface by the hologram; and
a shading film formed on the second surface of the transparent light converging medium and having an aperture in a position where the shading film shades the light spot, the aperture having a width smaller than the diameter of the light spot.

16. The optical head according to claim 15, wherein the aperture has one width smaller than the diameter of the light spot and another width larger than the light spot diameter.

17. The optical head according to claim 15, wherein the aperture is a fine aperture having a size that enables the whole of the aperture to be positioned inside of the light spot.

18. The optical head according to claim 15, wherein the aperture is rectangular.

19. The optical head according to claim 15, wherein the transparent light converging medium has a projection of which a part is located within the aperture.

20. The optical head according to claim 15, wherein the transparent light converging medium has a refractive index of larger than 1.

21. The optical head according to claim 15, wherein the hologram is a convex/concave type binary hologram.

22. The optical head according to claim 15, wherein the hologram is a volume hologram.

23. The optical head according to claim 15, wherein the laser beam emitting unit is a distributed feed back type laser.

24. The optical head according to claim 15, wherein the laser beam emitting unit is a surface emitting laser.

25. The optical head according to claim 15, wherein the second surface is substantially a flat surface.

26. The optical head according to claim 15, wherein the transparent light converging medium is a flying slider adapted to fly and seek while allowing a clearance to be formed between the second surface and the optical disk with rotation of the optical disk.

27. The optical head according to claim 15, wherein
the transparent light converging medium comprises a first transparent medium and a second transparent medium both in close contact with each other and having the same refractive index,
the first transparent medium having the first surface and the third surface, and
the second transparent medium having the second surface and being a flying slider adapted to fly and seek while allowing a clearance to be formed between the second surface and the optical disk with rotation of the optical disk.

28. An optical disk drive having an optical head which converges a laser beam to form a light spot on a rotary disk and which records or reproduces information with use of the light spot, comprising:
a laser beam emitting unit that emits the laser beam;
a transparent light converging medium having a first surface onto which is adhered a hologram having a function of converging the laser beam and on which the laser beam emitted from the laser beam emitting unit is incident through the hologram and a second surface on which the laser beam incident on the first surface is focused to form the light spot; and
a shading film formed on the second surface of the transparent light converging medium and having an aperture in a position where the shading film shades the light spot, the aperture having a width smaller than the diameter of the light spot.

29. The optical disk apparatus according to claim 28, wherein the aperture is in the shape of a slit having one width smaller than the diameter of the light spot and another width larger than the light spot diameter.

30. The optical disk apparatus according to claim 29, wherein the aperture is a fine aperture having a size that enables the whole of the aperture to be positioned inside of the light spot.

31. An optical disk apparatus having an optical head which converges a laser beam to form a light spot on a rotary disk and which records or reproduces information with use of the light spot, the optical head comprising:
a laser beam emitting unit that emits the laser beam;
a transparent light converging medium having a first surface on which the laser beam emitted from the laser beam emitting unit is incident and which has a function of diffusing the incident laser beam, a second surface which reflects the laser beam incident on the first surface, and a third surface onto which is adhered a hologram having a function of reflecting and converging the laser beam and which causes the laser beam reflected by the second surface to be reflected and converged into a light spot on a different surface by the hologram; and a shading film formed on the second surface of the transparent light converging medium and having an aperture in a position where the shading film shades the light spot, the aperture having a width smaller than the diameter of the light spot.

32. The optical disk apparatus according to claim 31, wherein the aperture is in the shape of a slit having one width smaller than the diameter of the light spot and another width larger than the light spot diameter.

33. The optical disk apparatus according to claim 31, wherein the aperture is a fine aperture having a size that enables the whole of the aperture to be positioned inside of the light spot.

34. An optical disk apparatus having a plurality of rotary optical disks arranged coaxially at a predetermined spacing and also having a plurality of optical heads which converge laser beams to form light spots on the plural optical disks respectively and which record or reproduce information with use of the light spots, the optical heads each comprising:

a laser beam emitting unit that emits the laser beam;

a transparent light converging medium onto which is adhered a hologram having a function of converging the laser beam and on which the laser beam emitted from the laser beam emitting unit is incident through the hologram and a second surface on which the laser beam incident on the first surface is focused to form the light spot; and a shading film formed on the second surface of the transparent light converging medium and having an aperture in a position where the shading film shades the light spot, the aperture having a width smaller than the diameter of the light spot.

35. The optical disk apparatus according to claim 34, wherein the aperture is in the shape of a slit having one width smaller than the diameter of the light spot and another width larger than the light spot diameter.

36. The optical disk apparatus according to claim 34, wherein the aperture is a fine aperture having a size that enables the whole of the aperture to be positioned inside of the light spot.

37. An optical disk apparatus having a plurality of rotary optical disks arranged coaxially at a predetermined spacing and also having a plurality of optical heads which converge laser beams to form light spots on the plural optical disks respectively and which record or reproduce information with use of the light spots, the optical heads each comprising:

a laser beam emitting unit that emits the laser beam;

a transparent light converging medium having a first surface on which the laser beam emitted from the laser beam emitting unit is incident and which has a function of diffusing the incident laser beam, a second surface which reflects the laser beam incident on the first surface, and a third surface onto which is adhered a hologram having a function of reflecting and converging the laser beam and which causes the laser beam reflected by the second surface to be reflected and converged to form the light spot on a different surface by the hologram; and a shading film formed on the second surface of the transparent light converging medium and having an aperture in a position where the shading film shades the light spot, the aperture having a width smaller than the diameter of the light spot.

38. The optical disk apparatus according to claim 37, wherein the aperture has one width smaller than the diameter of the light spot and another width larger than the light spot diameter.

39. The optical disk apparatus according to claim 37, wherein the aperture is a fine aperture having a size that enables the whole of the aperture to be positioned within the light spot.

* * * * *